US012536942B2

(12) United States Patent
Hou et al.

(10) Patent No.: US 12,536,942 B2
(45) Date of Patent: Jan. 27, 2026

(54) DISPLAY PANEL, DRIVING METHOD THEREOF, DEVICE, AND COMPUTER READABLE STORAGE MEDIUM

(71) Applicant: BOE Technology Group Co., Ltd., Beijing (CN)

(72) Inventors: Yifan Hou, Beijing (CN); Tiankuo Shi, Beijing (CN); Minglei Chu, Beijing (CN); Xiangjun Peng, Beijing (CN); Yan Sun, Beijing (CN); Yaofeng Li, Beijing (CN); Rui Liu, Beijing (CN); Wei Sun, Beijing (CN); Xin Duan, Beijing (CN); Huiling Xue, Beijing (CN); Qiong Wu, Beijing (CN); Shuo Zhang, Beijing (CN); Tao Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/558,747

(22) PCT Filed: Jan. 31, 2023

(86) PCT No.: PCT/CN2023/074012
§ 371 (c)(1),
(2) Date: Nov. 3, 2023

(87) PCT Pub. No.: WO2024/159411
PCT Pub. Date: Aug. 8, 2024

(65) Prior Publication Data
US 2025/0299612 A1 Sep. 25, 2025

(51) Int. Cl.
*G09G 3/20* (2006.01)

(52) U.S. Cl.
CPC ... *G09G 3/2074* (2013.01); *G09G 2320/0233* (2013.01); *G09G 2360/16* (2013.01)

(58) Field of Classification Search
CPC ......... G09G 3/2074; G09G 2320/0233; G09G 2360/16
See application file for complete search history.

(56) References Cited

U.S. PATENT DOCUMENTS

2021/0166654 A1 6/2021 Yu et al.
2022/0036590 A1 2/2022 Zuo
(Continued)

FOREIGN PATENT DOCUMENTS

CN 106898305 A 6/2017
CN 107958651 A 4/2018
(Continued)

*Primary Examiner* — Dennis P Joseph
(74) *Attorney, Agent, or Firm* — Ling Wu; Stephen Yang; Ling and Yang Intellectual Property

(57) ABSTRACT

A display panel and driving method thereof, device, and computer-readable storage medium. The display panel includes a first region including a first sub-pixel displaying a first color, the first color includes a first gray scale segment and a second gray scale segment. The method includes: inputting a first data voltage group to a first sub-pixel corresponding to the first gray scale segment in the first region; inputting a second data voltage group to a first sub-pixel corresponding to the second gray scale segment in the first region; first data voltage group includes multiple first data voltages, input gray scales corresponding to which are same, the second data voltage group includes multiple second data voltages, input gray scales corresponding to which are same, a first data voltage standard deviation of the first data voltage group is larger than a second data voltage standard deviation of the second data voltage group.

20 Claims, 12 Drawing Sheets

(56) References Cited

U.S. PATENT DOCUMENTS

| | | | | |
|---|---|---|---|---|
| 2023/0030179 | A1* | 2/2023 | Chen | G09G 5/10 |
| 2023/0343300 | A1* | 10/2023 | Liu | G09G 3/3291 |
| 2024/0046835 | A1 | 2/2024 | Zhang | |
| 2024/0296772 | A1* | 9/2024 | Kim | G09G 3/20 |

FOREIGN PATENT DOCUMENTS

| | | | |
|---|---|---|---|
| CN | 111161663 | A | 5/2020 |
| CN | 111402825 | A | 7/2020 |
| CN | 113096610 | A | 7/2021 |
| CN | 113674663 | A | 11/2021 |
| CN | 113870802 | A | 12/2021 |
| CN | 115019716 | A | 9/2022 |
| JP | 2022-27438 | A | 2/2022 |
| KR | 10-2015-0028407 | A | 3/2015 |
| WO | 2020232588 | A1 | 11/2020 |

* cited by examiner

DISPLAY PANEL, DRIVING METHOD THEREOF, DEVICE, AND COMPUTER READABLE STORAGE MEDIUM

CROSS-REFERENCE TO RELATED APPLICATION

The present application is a U.S. National Phase Entry of International Application No. PCT/CN2023/074012 having an international filing date of Jan. 31, 2023, the content of which is hereby incorporated by reference.

TECHNICAL FIELD

Embodiments of the present disclosure relate to, but are not limited to, the field of display technologies, and particularly to a display panel and a method thereof, a device, and a computer readable storage medium.

BACKGROUND

With the continuous development of electronic technology, product forms of intelligent terminals such as electronic devices are becoming more and more abundant. Especially in order to improve the display effect of electronic devices, more and more electronic devices are equipped with Organic Light-Emitting Diode (OLED) or Light-Emitting Diode (LED) display panels. However, due to the lack of uniformity and stability in the manufacturing process of OLED or LED display panel, which is difficult to overcome, there is "mura" display effect with inconsistent brightness and chroma on the display panel.

In order to optically compensate the "mura" display effect of the display panel, through a "Demura" manner, the display panel may be photographed by a camera and an optical compensation strategy is formulated according to the brightness information of the display panel in the photo, and the display panel of the electronic device is optically compensated according to the determined strategy.

SUMMARY

The following is a summary of subject matters described herein in detail. The summary is not intended to limit the protection scope of claims.

An embodiment of the present disclosure provides a method for driving a display panel, the display panel includes a first region including a first sub-pixel displaying a first color, the first color includes a first gray scale segment and a second gray scale segment. The method for driving a display panel includes: inputting a first data voltage group to a first sub-pixel corresponding to the first gray scale segment in the first region;

- inputting a second data voltage group to a first sub-pixel corresponding to the second gray scale segment in the first region; the first data voltage group includes multiple first data voltages, input gray scales corresponding to the multiple first data voltages are the same, the second data voltage group includes multiple second data voltages, input gray scales corresponding to the multiple second data voltages are the same, and a first data voltage standard deviation of the first data voltage group is larger than a second data voltage standard deviation of the second data voltage group.

An embodiment of the disclosure further provides a device for driving a display panel, which includes a memory and a processor coupled to the memory for storing instructions, the processor is configured to perform the act of the method for driving the display panel described in any embodiment of the present disclosure.

An embodiment of the present disclosure further provides a display panel including the device for driving the display panel as described in any embodiment of the present disclosure.

An embodiment of the present disclosure further provides a computer-readable storage medium having stored thereon a computer program, when the computer program is executed by a processor, the method for driving the display panel according to any embodiment of the present disclosure is implemented.

Other aspects may be comprehended upon the drawings and detailed description are read and understood.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure rather than constituting limitations on the technical solutions of the present disclosure. Shapes and sizes of various components in the drawings do not reflect actual scales, but are only intended to schematically illustrate contents of the present disclosure.

DETAILED DESCRIPTION

To make objectives, technical solutions, and advantages of the present disclosure more clear, the embodiments of the present disclosure will be described in detail with reference to the accompanying drawings. It is to be noted that the embodiments in the present disclosure and features in the embodiments may be randomly combined with each other if there is no conflict.

Unless otherwise defined, technical terms or scientific terms used in the embodiments of the present disclosure should have usual meanings understood by those of ordinary skills in the art to which the present disclosure belongs. "First", "second", and similar terms used in the embodiments of the present disclosure do not represent any order, quantity, or importance, but are only used for distinguishing different components. "Include", "contain", or a similar term means that an element or article appearing before the term covers an element or article and equivalent thereof listed after the term, and other elements or articles are not excluded.

Near-eye display requires high uniformity of a display screen. However, due to the limitation of manufacturing process of the display Panel, the display screen usually cannot meet the corresponding uniformity requirements, and external compensation (Demura) algorithm is needed to solve the above problem. Because the brightness distribution characteristics of different gray scale segments are different, in order to achieve better uniformity, different gray scale segments need different optical compensation parameters. Common schemes include the following two.

(1) Different optical compensation parameters are stored in different gray scale segments, and the optical compensation effect of the full gray scales is ensured by occupying large hardware storage.

(2) Only the optical compensation parameters of key gray scale segments are stored, and the optical compensation effect of the key gray scale segments is ensured by occupying less hardware storage.

The above two schemes cannot reduce the hardware storage and ensure the optical compensation effect of the full gray scales at the same time.

Figure 1A:
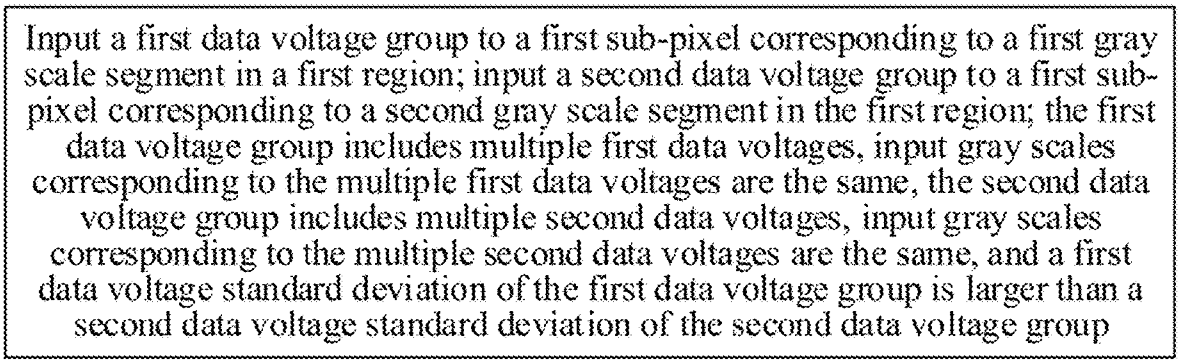
FIGS. 1A and 1B are flowcharts of two methods for driving a display panel according to exemplary embodiments of the present disclosure.

As shown in FIG. 1A, an embodiment of the present disclosure provides a method for driving a display panel. The display panel includes a first region including a first sub-pixel displaying a first color, the first color includes a first gray scale segment and a second gray scale segment. The method driving a display panel includes: inputting a first data voltage group to a first sub-pixel corresponding to the first gray scale segment in the first region; inputting a second data voltage group to a first sub-pixel corresponding to the second gray scale segment in the first region; wherein the first data voltage group includes multiple first data voltages, input gray scales corresponding to the multiple first data voltages are the same, the second data voltage group includes multiple second data voltages, input gray scales corresponding to the multiple second data voltages are the same, and a first data voltage standard deviation of the first data voltage group is larger than a second data voltage standard deviation of the second data voltage group.

Standard Deviation is the square root of Variance, which is represented by a. The standard deviation represents the dispersion degree of a group of values, and the larger the standard deviation, the greater the deviation between the group of values and the average value. In an embodiment of the present disclosure, the standard deviation of the data voltage σ may be calculated according to the following calculation formula:

$$\sigma = \sqrt{\frac{1}{N}\sum_{i=1}^{N}(x_i - \mu)^2},$$

where N is the number of sub-pixels, $x_i$ is a data voltage value of the i-th sub-pixel, and μ is the average value of data voltages for N sub-pixels. The n-th data voltage standard deviation is the standard deviation between the data voltages of the sub-pixels of the n-th data voltage group, where n is a natural number.

In the method for driving the display panel of the embodiment of the present disclosure, the first data voltage standard deviation of the first data voltage group is larger than the second data voltage standard deviation of the second data voltage group, so that the compensation effect of the first sub-pixel corresponding to the first gray scale segment in the first region is more uniform, and the corresponding compensation effect is better.

It may be understood by those skilled in the art that when a first display gray scale is input to a first sub-pixel corresponding to a first gray scale segment in a first region and a second display gray scale is input to a first sub-pixel corresponding to a second gray scale segment in a first region, if there is no optical compensation, the first data voltages of the first sub-pixels corresponding to the first gray scale segment should all be the same, and the second data voltages of the first sub-pixels corresponding to the second gray scale segment should all be the same. However, since there is optical compensation for the first sub-pixels of the first region and the compensation effect of the first sub-pixel corresponding to the first gray scale segment is greater than the compensation effect of the first sub-pixel corresponding to the second gray scale segment, the first data voltage standard deviation of the first data voltage group is greater than the second data voltage standard deviation of the second data voltage group.

Exemplarily, the first gray scale segment may be a preset base gray scale segment, and the second gray scale segment may be a preset non-base gray scale segment.

In an embodiment of the present disclosure, the base gray scale segment may be a gray scale segment that the user pays attention to. For example, assuming that the user pays more attention to the display effect of the low gray scale segment, the base gray scale segment may be set as 0 to 32, and the non-base gray scale segment may be set as 33 to 255. However, the embodiments of the present disclosure are not limited thereto, and the base gray scale segment and the non-base gray scale segment may be set as required. By setting the first gray scale segment and the second gray scale segment in the embodiment of the present disclosure, the requirement of customers to select the gray scale segment focused on by self-defining is met, and the gray scale segment with poor display can be compensated and improved, so as to ensure the uniformity of the full gray scales.

In some exemplary embodiments, inputting the first data voltage group to a first sub-pixel corresponding to a first gray scale segment in the first region includes:

determining an optical compensation parameter corresponding to each first sub-pixel corresponding to the first gray scale segment in the first region;

obtaining the gray scale value after optical compensation of each first sub-pixel corresponding to the first gray scale segment in the first region according to the input gray scale and optical compensation parameter of each first sub-pixel corresponding to the first gray scale segment in the first region; and determining and inputting the first data voltage of each first sub-pixel corresponding to the first gray scale segment in the first region according to the gray scale value after optical compensation of each first sub-pixel corresponding to the first gray scale segment in the first region.

In some exemplary embodiments, obtaining the gray scale value after optical compensation of the each first sub-pixel corresponding to the first gray scale segment in the first region according to the input gray scale and optical compensation parameter of the each first sub-pixel corresponding to the first gray scale segment in the first region, includes:

acquiring a full-screen adjustment value a;

for each first sub-pixel corresponding to the first gray scale segment in the first region, performing the following operations:

according to the full-screen adjustment value a, the input gray scale gray and the optical compensation parameter b corresponding to the first sub-pixel corresponding to the first gray scale segment in the first region, calculating an intermediate gray scale temp_gray: temp_gray=a*gray+b;

according to the intermediate gray scale temp_gray and a preset minimum gray scale min_gray and a preset maximum gray scale max_gray, obtaining the gray scale value after optical compensation demura_gray: demura_gray=min (max (temp_gray, min_gray), max_gray).

In some exemplary embodiments, inputting the second data voltage group to the first sub-pixel corresponding to the second gray scale segment in the first region includes: determining a segment parameter and optical compensation parameter corresponding to each first sub-pixel corresponding to the second gray scale segment in the first region;

according to the input gray scale, segment parameter and optical compensation parameter of the each first sub-pixel corresponding to the second gray scale segment in the first region, obtaining the gray scale value after optical compensation of the each first sub-pixel corresponding to the second gray scale segment in the first region; and according to the gray scale value after optical compensation of each first sub-pixel corresponding to the second gray scale segment in the first region, determining and inputting the second data voltage of each first sub-pixel corresponding to the second gray scale segment in the first region.

In some exemplary embodiments, the segment parameter includes a first segment parameter aa, a second segment parameter bb, and a third segment parameter brisebit, according to the input gray scale, segment parameter and optical compensation parameter of the each first sub-pixel corresponding to the second gray scale segment in the first region, obtaining the gray scale value after optical compensation of the each first sub-pixel corresponding to the second gray scale segment in the first region includes:

acquiring a full-screen adjustment value a;

for each first sub-pixel corresponding to the second gray scale segment in the first region, performing the following operations:

adjusting the optical compensation parameter by using a segment parameter corresponding to each first sub-pixel according to the following formula:

pro_b=aa*b*(2 ^brisebit)+bb, wherein b is the optical compensation parameter, and pro_b is the adjusted optical compensation parameter of each sub-pixel;

according to the full-screen adjustment value a, input gray scale gray and the adjusted optical compensation parameter pro_b of each sub-pixel, calculating an intermediate gray scale temp_gray: temp_gray=a*gray+pro_b;

according to the intermediate gray scale temp_gray and a preset minimum gray scale min_gray and a preset maximum gray scale max_gray, obtaining the gray scale value after optical compensation demura_gray: demura_gray=min (max (temp_gray, min_gray), max_gray).

In some other exemplary embodiments, inputting the second data voltage group to the first sub-pixel corresponding to the second gray scale segment in the first region includes: acquiring a full-screen adjustment value a; for each first sub-pixel corresponding to the second gray scale segment in the first region, performing the following operations: according to the full-screen adjustment value a and the input gray scale gray, calculating an intermediate gray scale temp_gray temp_gray=a*gray; according to the intermediate gray scale temp_gray and a preset minimum gray scale min_gray and a preset maximum gray scale max_gray, obtaining the gray scale value after optical compensation demura_gray: demura_gray=min (max (temp_gray, min_gray), max_gray); and according to the gray scale value after optical compensation of each first sub-pixel corresponding to the second gray scale segment in the first region, determining and inputting the second data voltage of each first sub-pixel corresponding to the second gray scale segment in the first region.

In some other exemplary embodiments, inputting the first data voltage group to the first sub-pixel corresponding to the first gray scale segment in the first region includes: determining an optical compensation parameter and partition adjustment value corresponding to each first sub-pixel corresponding to the first gray scale segment in the first region; according to the input gray scale, optical compensation parameters, and partition adjustment value of each first sub-pixel corresponding to the first gray scale segment in the first region, obtaining a gray scale value after optical compensation of each first sub-pixel corresponding to the first gray scale segment in the first region; and according to the gray scale value after optical compensation of each first sub-pixel corresponding to the first gray scale segment in the first region, determining and inputting the first data voltage of each first sub-pixel corresponding to the first gray scale segment in the first region.

In some exemplary embodiments, the first color further includes a third gray scale segment between the first gray scale segment and the second gray scale segment, the method for driving a display panel further includes: inputting a third data voltage group to a first sub-pixel corresponding to the third gray scale segment in the first region; wherein the third data voltage group includes multiple third data voltages, input gray scales corresponding to the multiple third data voltages are the same, and a third data voltage standard deviation of the third data voltage group is larger than the second data voltage standard deviation of the second data voltage group and smaller than the first data voltage standard deviation of the first data voltage group.

The method for driving the display panel of the embodiment of the present disclosure reduces the gray scale segment boundary by making the third data voltage standard deviation of the third data voltage group be between the second data voltage standard deviation of the second data voltage group and the first data voltage standard deviation of the first data voltage group, thus achieving the effect of smoothing and more adapting to the uniform distribution of the display panel.

Exemplarily, the first gray scale segment may be a preset base gray scale segment, the second gray scale segment may be a preset first non-base gray scale segment, and the third gray scale segment may be a preset second non-base gray scale segment, and at least one gray scale of the first non-base gray scale segment is adjacent to at least one gray scale of the base gray scale segment, and any gray scale of the second non-base gray scale segment is not adjacent to any gray scale of the base gray scale segment.

For example, the first gray scale segment may be 0 to 32, the second gray scale segment may be 33 to 55, and the third gray scale segment may be 56 to 255. Alternatively, the first gray scale segment may be 40 to 70, the second gray scale segment may be 30 to 39, 71 to 90, and the third gray scale segment may be 0 to 29, 91 to 255.

In some exemplary embodiments, inputting the third data voltage group to the first sub-pixel corresponding to the third gray scale segment in the first region includes: determining a segment parameter and optical compensation parameter corresponding to each first sub-pixel corresponding to the third gray scale segment in the first region; according to the input gray scale, segment parameter and optical compensation parameter of each first sub-pixel corresponding to the third gray scale segment in the first region, obtaining a gray scale value after optical compensation of each first sub-pixel corresponding to the third gray scale segment in the first region; and according to the gray scale value after optical compensation of each first sub-pixel corresponding to the third gray scale segment in the first region, determining and inputting the third data voltage of each first sub-pixel corresponding to the third gray scale segment in the first region.

In some exemplary embodiments, the display panel further includes a second region including a first sub-pixel displaying a first color.

The method for driving a display panel further includes: inputting a fourth data voltage group to a first sub-pixel corresponding to the first gray scale segment in the second region, and inputting a fifth data voltage group to a first sub-pixel corresponding to the second gray scale segment in the second region; wherein the fourth data voltage group includes multiple fourth data voltages, input gray scales corresponding to the multiple fourth data voltages are the same, the fifth data voltage group includes multiple fifth data voltages, input gray scales corresponding to the multiple fifth data voltages are the same, a fourth data voltage standard deviation of the fourth data voltage group is smaller than the first data voltage standard deviation, and a fifth data voltage standard deviation of the fifth data voltage group is smaller than the first data voltage standard deviation.

The method for driving the display panel of the embodiment of the present disclosure can not only improve the uniformity of the display panel, but also solve the reading rate limitation of the FLASH and ensure the feasibility of hardware implementation by compensating only the sub-pixels in the first region.

Exemplarily, the first region may be a human eye gaze region and the second region may be a non-human eye gaze region. The image quality requirement of the non-human eye gaze region is low, which does not require optical compensation, and fourth data voltages of the fourth data voltage group can be set according to the input display gray scale values. The image quality of the human eye gaze region is required to be high, and compensation is performed according to the preset optical compensation parameters, and first data voltages of the first data voltage group are set according to the input display gray scale values and the optical compensation parameters.

In some exemplary embodiments, inputting the fourth data voltage group to the first sub-pixel corresponding to the first gray scale segment in the second region, and inputting the fifth data voltage group to the first sub-pixel corresponding to the second gray scale segment in the second region includes: according to the input gray scale value of the first sub-pixel corresponding to the first gray scale segment in each of the second region, determining and inputting the fourth data voltage of the first sub-pixel corresponding to the first gray scale segment in each of the second regions; and according to the input gray scale value of the first sub-pixel corresponding to the second gray scale segment in each of the second region, determining and inputting the fifth data voltage of the first sub-pixel corresponding to the second gray scale segment in each of the second regions.

In some exemplary embodiments, the first region further includes a second sub-pixel displaying a second color, and the method for driving a display panel further includes: inputting a sixth data voltage group to a second sub-pixel corresponding to the first gray scale segment in the first region; wherein the sixth data voltage group includes multiple sixth data voltages, input gray scales corresponding to the multiple sixth data voltages are the same, and a sixth data voltage standard deviation of the sixth data voltage group is smaller than the first data voltage standard deviation of the first data voltage group.

The method for driving the display panel of the embodiment of the present disclosure focuses on compensating the first color sensitive to human eyes by making the sixth data voltage standard deviation of the sixth data voltage group smaller than the first data voltage standard deviation of the first data voltage group, so as to meet the color sensitivity requirement of human eyes and effectively improve the uniformity of the display panel.

In some exemplary embodiments, inputting the sixth data voltage group to the second sub-pixel corresponding to the first gray scale segment in the first region includes: according to the input gray scale value of the each second sub-pixel corresponding to the first gray scale segment in the first region, determining and inputting the sixth data voltage of each second sub-pixel corresponding to the first gray scale segment in the first region.

In some exemplary embodiments, inputting the sixth data voltage group to the second sub-pixel corresponding to the first gray scale segment in the first region includes: acquiring a full-screen adjustment value a; for each second sub-pixel corresponding to the first gray scale segment in the first region, performing the following operations: according to the full-screen adjustment value a and the input gray scale gray, calculating an intermediate gray scale temp_gray temp_gray=a*gray; according to the intermediate gray scale temp_gray and a preset minimum gray scale min_gray and a preset maximum gray scale max_gray, obtaining a gray scale value after optical compensation demura_gray: demura_gray=min (max (temp_gray, min_gray), max_gray); and according to the gray scale value after optical compensation of each second sub-pixel corresponding to the first gray scale segment in the first region, determining and inputting the sixth data voltage of each second sub-pixel corresponding to the first gray scale segment in the first region.

In some exemplary embodiments, a sixth data voltage standard deviation of the sixth data voltage group is equal to the fourth data voltage standard deviation of the fourth data voltage group (equal to 0), and the sixth data voltage standard deviation of the sixth data voltage group is equal to the fifth data voltage standard deviation of the fifth data voltage group (equal to 0).

In the method for driving the display panel according to the embodiment of the present disclosure, the sixth data voltage standard deviation of the sixth data voltage group is equal to the fourth data voltage standard deviation of the fourth data voltage group, and the sixth data voltage standard deviation of the sixth data voltage group is equal to the fifth data voltage standard deviation of the fifth data voltage group, the second color with low human eye sensitivity is not compensated (same as the second region of the display panel), the requirements of human eye color sensitivity are met, and hardware storage and hardware area can be reduced without affecting the uniformity of the display panel.

Exemplarily, the first color may be green, and the second color may be red or blue.

In some exemplary embodiments, the first region further includes a first optical compensation block and a second optical compensation block; the method for driving a display panel further includes: inputting a seventh data voltage group to a first sub-pixel corresponding to the first gray scale segment in the first optical compensation block; inputting an eighth data voltage group to a first sub-pixel corresponding to the first gray scale segment in the second optical compensation block; wherein, the seventh data voltage group includes multiple seventh data voltages, the eighth data voltage group includes multiple eighth data voltages, input gray scales corresponding to the multiple seventh data voltages and the multiple eighth data voltages are the same, and a seventh data voltage corresponding to a sub-pixel located in a central region of the first optical compensation block is larger than a seventh data voltage corresponding to a sub-pixel adjacent to the second optical compensation block in the first optical compensation block; an eighth data voltage corresponding to a sub-pixel located in a central region of the second optical compensation block is smaller than an eighth data voltage corresponding to a sub-pixel adjacent to the first optical compensation block in the second optical compensation block.

The embodiment of the present disclosure reduces the boundary difference between the optical compensation blocks by partitioning and smoothing the optical compensation parameters of each sub-pixel in each optical compensation block, thus achieving the effect of smoothing and more adapting to the uniform distribution of the display panel.

In some exemplary embodiments, inputting the seventh data voltage group to the first sub-pixel corresponding to the first gray scale segment in the first optical compensation block and inputting the eighth data voltage group to the first sub-pixel corresponding to the first gray scale segment in the second optical compensation block includes: acquiring a segment parameter corresponding to the first gray scale segment; acquiring an optical compensation parameter corresponding to each first sub-pixel in the first optical compensation block and the second optical compensation block and optical compensation parameters corresponding to first sub-pixels in an m1*n1 region around the each first sub-pixel, wherein m1 and n1 are odd numbers greater than 1; according to the optical compensation parameters corresponding to the first sub-pixel in the m1*n1 region around the each first sub-pixel, performing weighting filtering on the optical compensation parameter corresponding to each first sub-pixel in the first optical compensation block and the second optical compensation block to obtain a final optical compensation parameter of each first sub-pixel; and according to the segment parameter corresponding to the first gray scale segment, the final optical compensation parameter of each first sub-pixel and an input gray scale value, obtaining and inputting a seventh data voltage or an eighth data voltage corresponding to each first sub-pixel.

Figure 1B:
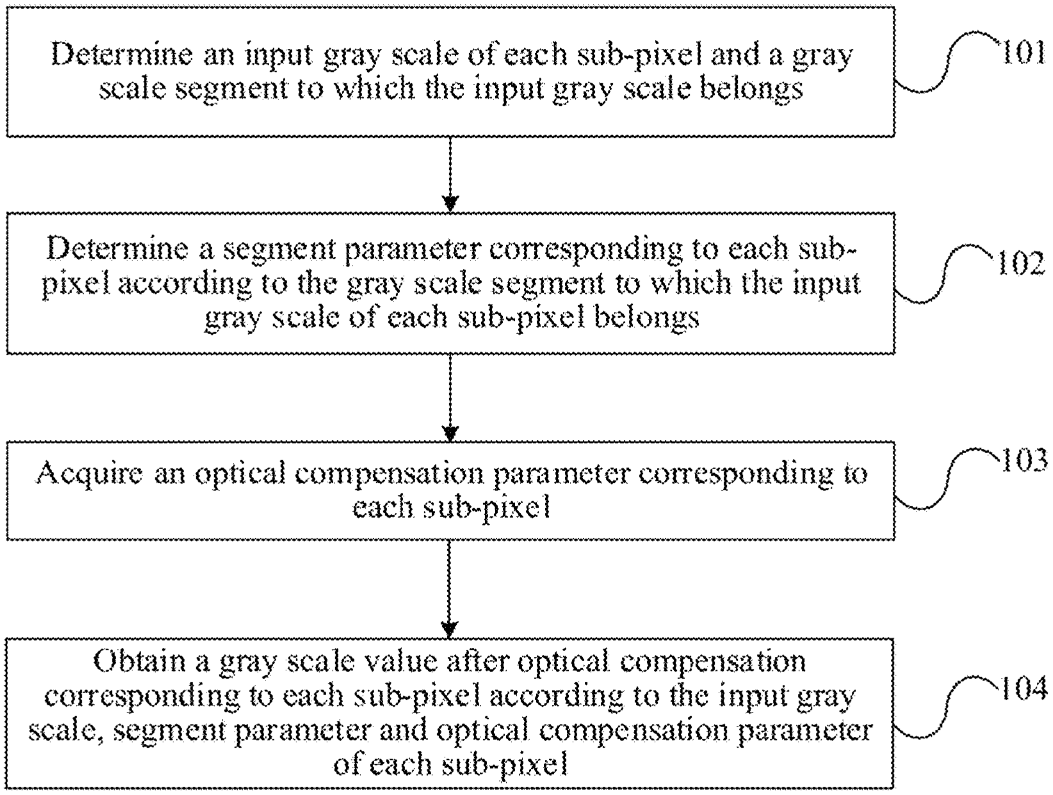

As shown in FIG. 1B, an embodiment of the present disclosure further provides a method for driving a display panel, wherein the display panel includes multiple optical compensation blocks, each optical compensation block includes one or more sub-pixels, and each optical compensation block corresponds to an optical compensation parameter, and the method for driving a display panel includes the following acts 101 to 104.

In act 101, a input gray scale of each sub-pixel of the display panel and a gray scale segment to which the input gray scale belongs are determined.

In act 102, according to the gray scale segment to which the input gray scale of each sub-pixel belongs, a segment parameter corresponding to each sub-pixel is determined.

In act 103, an optical compensation parameter corresponding to each sub-pixel is acquired.

In act 104, according to the input gray scale, segment parameter and optical compensation parameter of each sub-pixel, a gray scale value after optical compensation corresponding to each sub-pixel is obtained.

The method for driving the display panel of the embodiment of the invention can effectively improve the screen uniformity of the full gray scales and improve the display image quality and the output quality by storing a segment parameter corresponding to each gray scale segment and the optical compensation parameter corresponding to each optical compensation block in advance and performing optical compensation with combination of the segment parameters and the optical compensation parameters. In addition, the hardware storage is greatly reduced, the hardware implementation cost is reduced, and the algorithm is easy to be integrated into the chip digital circuit.

Figure 2A:
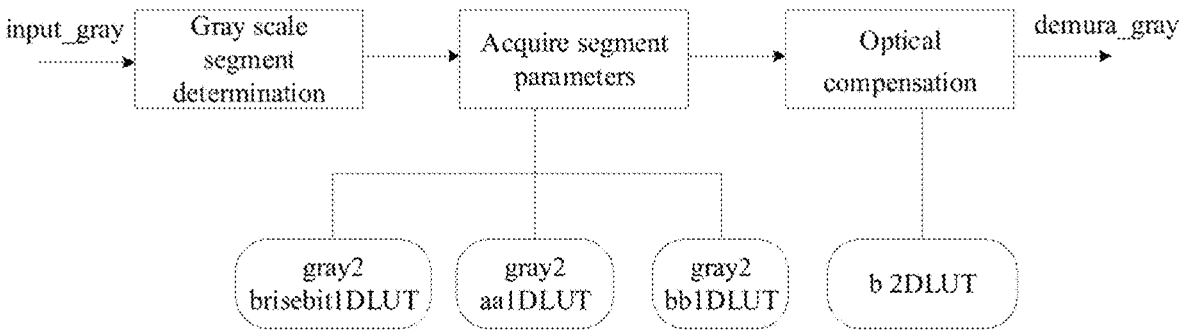
FIGS. 2A and 2B are flowcharts of two other methods for driving a display panel according to exemplary embodiments of the present disclosure.
Figure 2B:
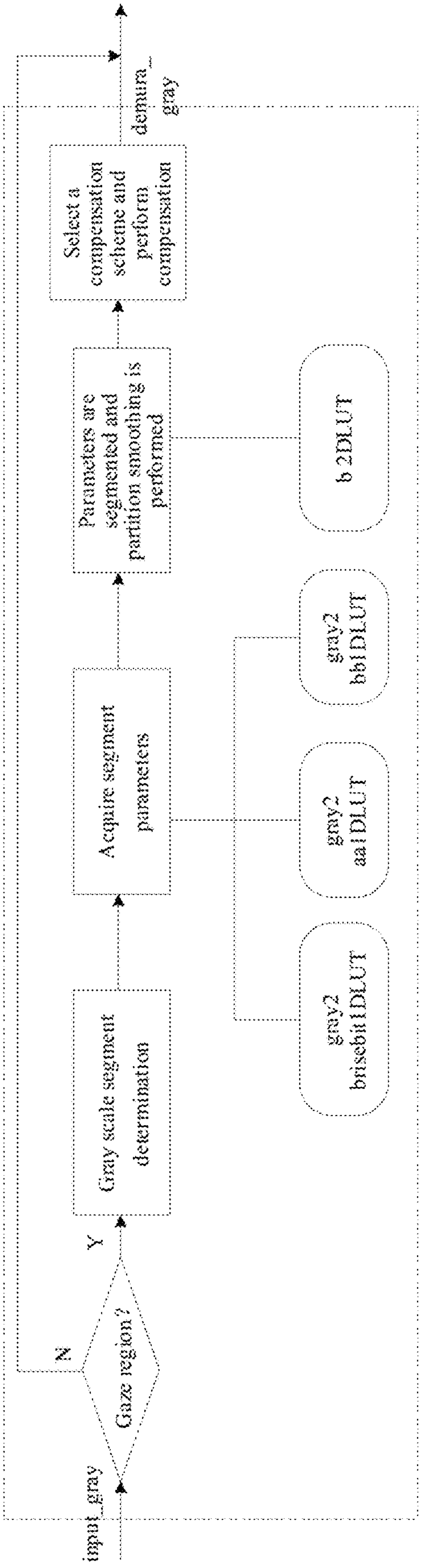

In some exemplary embodiments, as shown in FIGS. 2A and 2B, the segment parameter includes a first segment parameter aa, a second segment parameter bb, and a third segment parameter brisebit, and the display panel stores in advance a segment parameter lookup table including multiple gray scale segments and a segment parameter that is in one-to-one correspondence with each gray scale segment. As an example, for the first segment parameter aa, the second segment parameter bb, and the third segment parameter brisebit, the display panel stores three one-to-one lookup tables, respectively: a first segment parameter aa lookup table gray2aa 1DLUT, a second segment parameter bb lookup table gray2bb 1DLUT, and a third segment parameter brisebit lookup table gray2brisebit 1DLUT, as shown in tables 1 to 3.

TABLE 1

| gray | aa |
|---|---|
| $gray_0$ | $aa_0$ |
| $gray_1$ | $aa_1$ |
| $gray_2$ | $aa_2$ |
| . . . | . . . |
| $gray_n$ | $aa_n$ |

TABLE 2

| gray | bb |
|---|---|
| $gray_0$ | $bb_0$ |
| $gray_1$ | $bb_1$ |
| $gray_2$ | $bb_2$ |
| . . . | . . . |
| $gray_n$ | $bb_n$ |

TABLE 3

| gray | brisebit |
|---|---|
| $gray_0$ | $brisebit_0$ |
| $gray_1$ | $brisebit_1$ |
| $gray_2$ | $brisebit_2$ |
| . . . | . . . |
| $gray_n$ | $brisebit_n$ |

In tables 1 to 3, the first columns are the gray scale segment values, and the second columns are values of the first segment parameter aa, the second segment parameter bb and the third segment parameter brisebit corresponding to the gray scale segments, respectively.

In some exemplary embodiments, in act 101, determining the gray scale segment to which the input gray scale belongs includes: acquiring a value of $gray_n$ in the first segment parameter aa lookup table (or may be the second segment parameter bb lookup table, or the third segment parameter brisebit lookup table); when the input gray scale input_gray≥$gray_n$, a gray scale segment to which the input gray scale belongs is a segment from $gray_n$ to 255, and the corresponding gray scale segment serial number serial=n; when the input gray scale input_g□ay<$gray_n$, the gray stage to which the input gray scale input_gray belongs is traversed in the first column of data in the first segment parameter aa lookup table (or may be the second segment parameter bb lookup table, or the third segment parameter brisebit lookup table); when $gray_{serial}$≤input_gray<$gray_{serial+1}$, the gray scale segment to which the input gray scale belongs is a segment from $gray_{serial}$ to $gray_{serial+1}$, and the corresponding gray scale segment serial number is the value of the serial.

In some exemplary embodiments, in act 102, according to the gray scale segment to which the input gray scale of each sub-pixel belongs, determining the segment parameter corresponding to each sub-pixel includes: respectively reading values of $aa_{serial}$, $bb_{serial}$ and $brisebit_{serial}$ corresponding to the gray scale segment serial number serial corresponding to the input gray scale of each sub-pixel from the first segment parameter aa lookup table, the second segment parameter bb lookup table and the third segment parameter brisebit lookup table, as the first segment parameter aa, the second segment parameter bb, and the third segment parameter brisebit corresponding to each sub-pixel.

In some exemplary embodiments, in act 103, the display panel includes multiple optical compensation blocks each including x*y sub-pixels, where x is greater than or equal to 1, and y is greater than or equal to 1.

Exemplarily, x=2, y=3; or, x=4 and y=4, however, embodiments of the present disclosure are not limited thereto. The optical compensation parameters corresponding to multiple sub-pixels in each optical compensation block are the same. Taking the display panel with 3840*3840 resolution as an example, assuming that 4*4 sub-pixels are used as an optical compensation block, the optical compensation parameter lookup table b 2DLUT stored in the display panel is 960 columns*960 rows.

In some exemplary embodiments, in act 103, the acquiring optical compensation parameter corresponding to each sub-pixel includes: calculating a serial number of an optical compensation block corresponding to each sub-pixel according to the following formulas:

$$lut\_y = floor(panel\_y/block\_row);$$

$$lut\_x = floor(panel\_x/block\_col);$$

herein, floor represents downward rounding, (panel_x, panel_y) is a position coordinate of each sub-pixel on the display panel, (lut_x, lut_y) is a serial number of an optical compensation block corresponding to each sub-pixel, and block_row and block_col are the numbers of sub-pixels in the sub-pixel row direction and sub-pixel column direction of each optical compensation block respectively;

according to the serial number (lut_x, lut_y) of the optical compensation block corresponding to each sub-pixel, reading the optical compensation parameter b corresponding to the lut_y row and lut_x column in the optical compensation parameter lookup table.

In some exemplary embodiments, in act 104, according to the input gray scale, segment parameter and optical compensation parameter of each sub-pixel, obtaining the gray scale value after optical compensation corresponding to each sub-pixel includes: adjusting the optical compensation parameter by using the segment parameter corresponding to each sub-pixel, to obtain the adjusted optical compensation parameter of each sub-pixel; and according to the adjusted optical compensation parameter of each sub-pixel and the input gray scale, generating a corresponding gray scale value after optical compensation of each sub-pixel.

In some exemplary embodiments, the optical compensation parameter is adjusted using the segment parameter corresponding to each sub-pixel according to the following formula: pro_b=aa*b*(2 ^brisebit)+bb, where pro_b is the adjusted optical compensation parameter of each sub-pixel, b is the optical compensation parameter, aa is the first segment parameter, bb is the second segment parameter, and brisebit is the third segment parameter.

Because the brightness distribution characteristics of different gray scale segments are different, in order to achieve better uniformity, different gray scale segments need different optical compensation parameters. According to the method for driving a display panel of the embodiment of the present invention, based on a principle that only the optical compensation parameter lookup table b 2DLUT of the base gray scale segment is saved, the optical compensation parameter b of the base gray scale segment can be adjusted by combining the value range (brisebit), slope (aa) and intercept (bb) of the above formula, so as to obtain the optical compensation parameter pro_b which more matches the corresponding gray scale.

In some exemplary embodiments, according to the adjusted optical compensation parameter of each sub-pixel and the input gray scale, generating the corresponding gray scale value after optical compensation of each sub-pixel includes: according to the full-screen adjustment value a, the adjusted optical compensation parameter pro_b of each sub-pixel, and input gray scale gray, calculating an intermediate gray scale temp_gray: temp_gray=a*gray+pro_b; and according to the intermediate gray scale temp_gray and a preset minimum gray scale min_gray and a preset maximum gray scale max_gray, obtaining the gray scale value after optical compensation demura_gray: demura_gray=min (max (temp_gray, min_gray), max_gray), that is, when temp_gray<min_gray, demura_gray=min_gray; when min_gray<temp_gray<max_gray, demura_gray=temp_gray; when temp_gray>max_gray, demura_gray=max_gray.

In the embodiment of the present disclosure, all sub-pixels in the display panel use the consistent full-screen adjustment value a and the adjusted optical compensation parameter pro_b corresponding to each sub-pixel for optical compensation, so as to obtain the final gray scale value demura_gray after optical compensation, thereby effectively reducing the parameter storage amount. The preset minimum gray scale min_gray and maximum gray scale max_gray correspond to the upper and lower gray scale limits. For example, the 8 bit display panel may display 256 gray scales, the min_gray and max_gray are 0 and 255 respectively.

In the embodiment of the present disclosure, all sub-pixels in the full screen may use a consistent adjustment value a, or all sub-pixels in each optical compensation block may use a consistent adjustment value a, or each sub-pixel may use a respective adjustment value a. When a consistent adjustment value a is used for all sub-pixels in each optical compensation block, each sub-pixel in the display panel may perform optical compensation by block using the consistent partition adjustment value a and the adjusted optical compensation parameter pro_b corresponding to each sub-pixel, to obtain a final gray scale value demura_gray after optical compensation. In this case, the display panel needs to store a partition adjustment value lookup table. When the gray scale value after optical compensation corresponding to each sub-pixel is calculated, the partition adjustment value a corresponding to the lut_y row and the lut_x column in the partition adjustment value lookup table may be read according to the optical compensation block serial number (lut_x, lut_y) corresponding to each sub-pixel while the optical compensation parameter b corresponding to each sub-pixel is acquired, and then according to the partition adjustment value a, the adjusted optical compensation parameter pro_b of each sub-pixel and the input gray scale gray, an intermediate gray scale temp_gray is calculated: temp_gray=a*gray+pro_b (or, it may be directly compensated by a slope compensation approach, that is, temp_gray=a*gray). According to the intermediate gray scale temp_gray and a preset minimum gray scale min_gray and a preset maximum gray scale max_gray, the gray scale value after optical compensation demura_gray is obtained: demura_gray=min (max (temp_gray, min_gray), max_gray). That is, when temp_gray<min_gray, demura_gray=min_gray; when min_gray<temp_gray<max_gray, demura_gray=temp_gray; when temp_gray>max_gray, demura_gray=max_gray.

In some exemplary embodiments, as shown in FIG. 2B, the method for driving a display panel further includes: determining whether the display region on the display panel corresponding to the current sub-pixel is a human eye gaze region; if it is the human eye gaze region, obtaining the gray scale value after optical compensation corresponding to the current sub-pixel according to the input gray scale, segment parameter and optical compensation parameter of the current sub-pixel; and if it is a non-human eye gaze region, directly outputting the input gray scale of the current sub-pixel as a target gray scale without uniformity compensation.

Figure 2C:
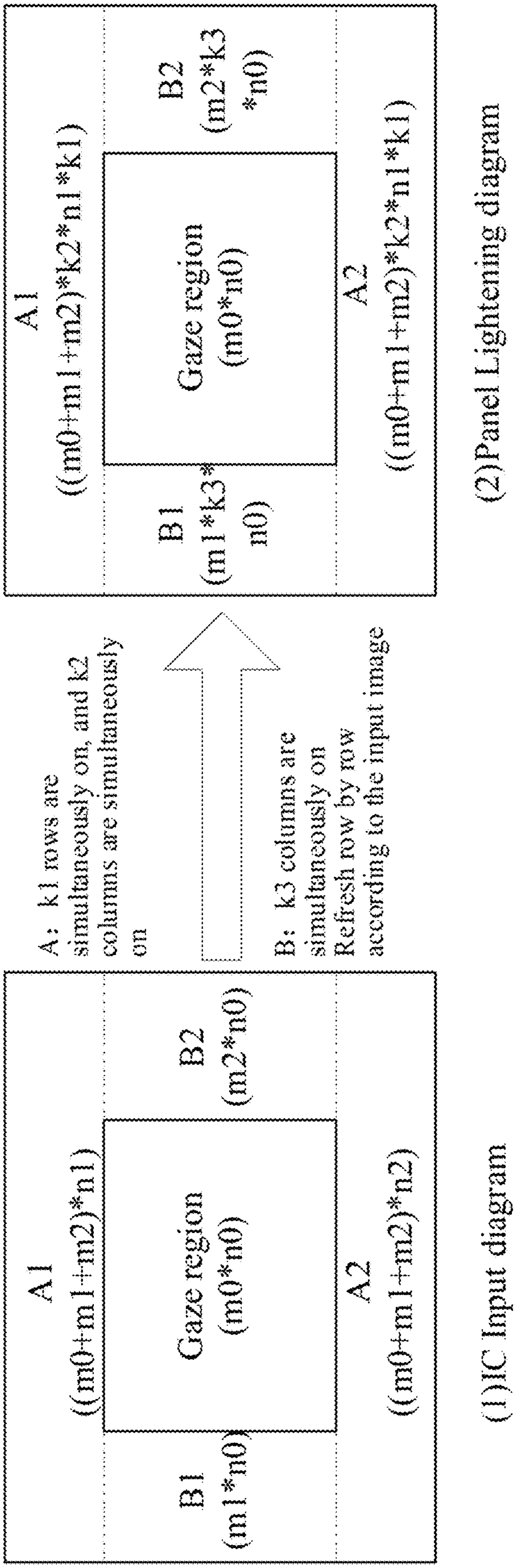
FIG. 2C is a flowchart of another method for driving a display panel according to an exemplary embodiment of the present disclosure.

In this embodiment, the camera may be used to capture a center coordinate (x, y) of the gaze point of the human eye on the panel at the current time. If a size of the gaze region is M*N, a corresponding region of from (x−M/2) to (x+M/2) columns and from (y−N/2) to (y+N/2) rows on panel is the human eye gaze region. As shown in FIG. 2C, for image information in the human eye gaze region, high display quality is required, one-to-one pixel input and display are required, and uniformity of this region is required to be high. However, for the information in the non-human eye gaze region, that is, the A1/A2/B1/B2 region in FIG. 2C, the image quality requirements of the above four regions are low, and the image information is compressed by a certain compression ratio and then transmitted to the display driver chip (IC) for display, so the uniformity requirements of the four regions are also low.

When one pixel is input (coordinate is (x0, y0)), when (x−M/2)<=x0<=(x+M/2), and (y−N/2)<=y0<=(y+N/2), the pixel is in the human eye gaze region, and compensation of the uniformity of the pixel should be focused on. Therefore, according to the input gray scale, segment parameter and optical compensation parameter of the current sub-pixel, the gray scale value after optical compensation corresponding to the current sub-pixel is obtained. When (x−M/2)<=x0<=(x+M/2) and (y−N/2)<=y0<=(y+N/2) are not satisfied, the pixel is in the non-human eye gaze region and will not apply a great impact on the overall visual effect, so it can be directly output without uniformity compensation, that is, demura_gray=gray.

In some exemplary embodiments, the display panel includes a display driver chip including a gaze tracking unit, an image receiving unit, an image parsing unit, and an image driving unit.

The gaze tracking unit is configured to acquire a user image acquired by an external pupil image acquisition component, perform real-time locating of a pupil center of a human eye and real-time calculation of a gaze point coordinate on the acquired user image, acquire gaze point coordinate of the human eye in real time, and output the gaze point coordinate of the human eye to the image parsing unit.

The image receiving unit is configured to receive image data to be played through a first image interface and input image data to be played to the image parsing unit.

The image parsing unit is configured to compress or decompress the image data to be played according to the gaze coordinate of the human eye, and output the compressed or decompressed image data to the image driving unit.

The image driving unit is configured to receive the image data output by the image parsing unit, and control the connected display panel to perform real-time driving and display according to a compression mode of the image data and the coordinate of the gaze point.

In some exemplary embodiments, the gaze tracking unit includes a human eye detection unit, a pupil locating unit, and a gaze point calculation unit.

The human eye detection unit is configured to detect a human eye of a face image acquired by the pupil image acquisition component and output the detected human eye image to the pupil locating unit.

The pupil locating unit is configured to calculate a position coordinate of the pupil of the human eye in the human eye image.

The gaze point calculating unit is configured to calculate a gaze point coordinate of the human eye according to the position coordinate of the human eye pupil in the human eye image, and output the gaze point coordinate of the human eye to the image parsing unit.

In some exemplary embodiments, the external pupil image acquisition component may be an infrared camera, and the pupil image acquisition component may provide the display driving chip with images of human face or eye in real time.

In some exemplary embodiments, while the gaze tracking unit (gaze point calculating unit) outputs the gaze point coordinate of the human eye to the image parsing unit, it may also output the gaze point coordinate of the human eye to an external image playing unit (i.e., a playing system side) so that the image playing unit compresses image data to be played according to the gaze point coordinate of the human eye.

In some exemplary embodiments, one or more of the human eye detection unit, the pupil locating unit, and the gaze point calculation unit may all be implemented by an integrated IP (Intellectual Property) hard core.

In this embodiment, through the gaze tracking unit of the hardware-based Application Specific Integrated Circuit (ASIC) design, advantages of parallel calculation can be utilized, and the embodiment has the characteristics of fast real-time response, high locating accuracy, etc. While the driving pressure of the playing system side is reduced, the display device is ensured to have a smoother display effect.

In some exemplary embodiments, the pupil locating unit may include an image preprocessing module, a pupil edge coordinate acquisition module, and a pupil center coordinate acquisition module.

The image preprocessing module is configured to remove noise information in the human eye image and determine a pupil target region.

The pupil edge coordinate acquisition module is configured to determine pupil edge coordinates according to the pupil target region.

The pupil center coordinate acquisition module is configured to determine a pupil center coordinate according to the pupil edge coordinates.

In some exemplary embodiments, the image parsing unit is specifically configured to: when the image data to be played is compressed image data, detect whether the compressed image data needs to be decompressed, and if yes, decompress the compressed image data according to the gaze point coordinate of the human eye and output the decompressed image data to the image driving unit; if not, output compressed image data to the image driving unit; and when the image data to be played is original image data, store the original image data into a first buffer region to achieve frame buffering, read data of the first buffer region, compress the read data according to the gaze point coordinate of the human eye, and output the compressed data to the image driving unit.

In some exemplary embodiments, the image driving unit drives a human eye gaze region and a non-human eye gaze region with different driving timings, respectively, including: for the human eye gaze region, the following driving modes are adopted: gate lines are driven row by row, and multiplexed data lines are driven column by column; for the non-human eye gaze region, any one of the following driving modes are adopted: multiple rows of gate lines are combined into one row to be driven and multiplexed data lines are driven column by column respectively; gate lines are driven row by row respectively and multiplexed data lines are combined into one column to be driven; and multiple rows of gate lines are combined into one row to be driven and multiple columns of multiplexed data lines are combined into one column to be driven.

Exemplarily, as shown in FIG. 2C, the image driving unit adopts the following driving mode for the human eye gaze region: the multiplexed data lines of the human eye gaze region are driven column by column respectively and the gate lines are normally driven row by row. For the non-human eye gaze region, the driving mode adopted is that: in the non-human eye gaze region, the k1 rows of gate lines in the A1 and A2 regions are combined into one row for driving and the k2 columns of multiplexed data lines are combined into one column for driving (i.e., for the multiplexed data lines, a mode of multiple columns simultaneously on is adopted, for the gate lines, a mode of multiple rows simultaneously on is adopted, exemplary, k1=2, and k2=2, and the number of rows of gate lines combined or columns of multiplexed data lines is not limited in the embodiments of the present disclosure), the gate lines in the B1 and B2 regions are driven row by row respectively and the k3 columns of multiplexed data lines are combined into one column for driving (i.e., for the multiplexed data lines, a mode of multiple columns simultaneously on is adopted, and the gate lines are driven row by row respectively, exemplary, k3=2, and the number of rows of gate lines combined or columns of multiplexed data lines is not limited in the embodiments of the present disclosure), so that low-resolution images (i.e. compressed images) is displayed. The display panel includes (m0+m1+m2) columns and (n0+n1+n2) rows, the human eye gaze region includes m0 columns and n0 rows, the non-human eye gaze region A1 includes (m0+m1+m2) columns and n1 rows, the non-human eye gaze region A2 includes (m0+m1+m2) columns and n2 rows, the non-human eye gaze region B1 includes m1 columns and n0 rows, and the non-human eye gaze region B2 includes m2 columns and n0 rows.

In some exemplary embodiments, the method further includes: determining a segment parameter lookup table and an optical compensation parameter lookup table of the display panel, the segment parameter lookup table of the display panel is set according to one or more non-base gray scale segments, and the optical compensation parameter lookup table of the display panel is set according to one base gray scale segment and multiple optical compensation blocks.

The method for driving a display panel of the embodiment of the present disclosure, in the production process of the display panel, acquires the gray scale image corresponding to the display image of the display panel through a Charge Coupled Device (CCD) camera and a color analyzer, generates a segment parameter lookup table and an optical compensation parameter lookup table through processing and analyzing the brightness data of each sub-pixel, and burns the segment parameter lookup table and the optical compensation parameter lookup table onto a Flash chip.

In some exemplary embodiments, determining the optical compensation parameter lookup table of the display panel includes:

determining full gray scale brightness data of each sub-pixel, target brightness of each gray scale and a base gray scale segment;

determining a first target gray scale and a second target gray scale of each sub-pixel, wherein the first target gray scale is a gray scale corresponding to full gray scale brightness data closest to the target brightness of a maximum base gray scale in the base gray scale segment, and the second target gray scale is a gray scale corresponding to full gray scale brightness data closest to the target brightness of a minimum base gray scale in the base gray scale segment;

calculating an average value of the first target gray scale and an average value of the second target gray scale corresponding to each optical compensation block;

calculating an adjustment value and an optical compensation parameter value corresponding to each optical compensation block according to the average value of the first target gray scale and the average value of the second target gray scale corresponding to each optical compensation block;

generating a full-screen adjustment value according to the adjustment value corresponding to each optical compensation block; and detecting whether the uniformity of the base gray scale segment after optical compensation meets a preset first uniformity requirement, when the uniformity of the base gray scale segment after optical compensation does not meet the preset first uniformity requirement, shortening a length of the base gray scale segment and returning to the act of determining the first target gray scale and the second target gray scale of each sub-pixel for execution until the uniformity of the base gray scale segment after optical compensation meets the preset first uniformity requirement.

In some exemplary embodiments, the initial base gray scale segment may be set according to the gray scale segment concerned by the user, for example, if the customer is more concerned about uniformity below the gray scale 32, the initial base gray scale segment may be set as gray scale 0 to gray scale 32.

In some exemplary embodiments, determining full gray scale brightness data for each sub-pixel includes: testing brightness data of each sub-pixel under preset multiple gray scale binding points (this act may be performed by a CCD camera); and through linear interpolation, obtaining the full gray scale brightness data of each sub-pixel.

Exemplarily, the brightness data $test_{50}$[row][col]/$test_{150}$[row][col]/ . . . /$test_{255}$[row][col]) of each sub-pixel under a preset 5 gray scale binding points 50/150/200/250/255 may be tested by a CCD camera, where the screen resolution is col*row, and each $test_{gray\_n}$[row][col] stores brightness data of each sub-pixel under gray scale gray_n. The full gray scale brightness data of each sub-pixel is constructed by linear interpolation according to the following formula:

$$\text{Constructed brightness} = \frac{\text{Target gray scale} - \text{Measured small gray scale}}{\text{Measured large gray scale} - \text{Measured small gray scale}} \times \left(\begin{array}{c}\text{Measured large gray scale subpixel brightness} - \\ \text{Measured small gray scale subpixel brightness}\end{array}\right) +$$

-continued $$\text{Measured small gray scale subpixel brightness}$$

For example, if the gray scale 100 is between the actually measured gray scales 50 and 150, for the sub-pixel at col=20, row=10, when the gray scale is 100, the corresponding brightness data is $lv_{100}$[10][20]=(100−50)/(150−50)*($test_{150}$[10][20]−$test_{50}$[10][20])+$test_{50}$0[10][20].

In some exemplary embodiments, determining the target brightness of each gray scale includes: testing the Gamma brightness of the display panel under each gray scale (this act may be performed by a color analyzer); and taking the Gamma brightness of the display panel under each gray scale as the target brightness of each gray scale.

In this act, the input gray scale of each sub-pixel in the display panel is the same, and the values are selected one by one from the minimum gray scale 0 to the maximum gray scale 255. The Gamma brightness of the display panel under each gray scale (i.e., the overall brightness of the screen) is tested, and the Gamma brightness of the display panel under each gray scale is taken as the target brightness of each gray scale.

Taking a base gray scale segment of 100 to 132 as an example, assuming that the target brightness corresponding to gray scale 100 is 200 nits and the target brightness corresponding to gray scale 132 is 300 nits, when the first target gray scale and the second target gray scale of each sub-pixel are determined, assuming that for a certain sub-pixel, by traversing the full gray scale brightness data of the sub-pixel (i.e., brightness data corresponding from gray scale 0 to gray scale 255 in one-to-one mode), it is found that the brightness data corresponding to gray scale 100 is 185 nits, the brightness data corresponding to gray scale 101 is 195 nits, the brightness data corresponding to gray scale 102 is 211 nits, . . . , the brightness data corresponding to gray scale 131 is 290 nits, the brightness data corresponding to gray scale 132 is 295 nits, and the brightness data corresponding to gray scale 133 is 303 nits, . . . , then, since 200 nits is between 195 nits and 211 nits and closer to 195 nits, and 300 nits is between 295 nits and 303 nits and closer to 303 nits, the first target gray scale, corresponding to the gray scale 132, of the sub-pixel is 133, and the second target gray scale, corresponding to the gray scale 100, of the sub-pixel is 101.

Assuming that each optical compensation block includes four sub-pixels, in the optical compensation block where the sub-pixel is located, the first target gray scales, corresponding to the gray scale 132, of the other three sub-pixels are 132, 131, 134 respectively, and the second target gray scales corresponding to gray scale 100 are 101, 102, 104 respectively. Then the average value of the first target gray scales corresponding to the optical compensation block is [(133+132+131+134)/4]=133, and the average value of the second target gray scales [(101+101+102+104)/4]=102, where [ ] is a rounding symbol.

Assuming that the adjustment value of the optical compensation block is a1 and the optical compensation parameter value is b, then according to 133=a1*132+b and 102=a1*100+b, b=5. 1 and a1=0. 969 are obtained.

The adjustment values of multiple optical compensation blocks of the display panel are averaged, and the obtained average value is the full-screen adjustment value of the display panel. The optical compensation parameter values of various optical compensation blocks are integrated to obtain an optical compensation parameter lookup table.

In the above embodiment, the calculation is based on the actual gray scale values, but in actual use, the calculation may also be carried out by using the control voltage or the control current corresponding to the display panel. For example, assuming that the control bit width of the display panel is 12 bits, the control range of the corresponding control voltage is 0 to 4095 when the display panel is controlled by a 12-bit voltage, and when the display panel is controlled by a 12-bit current, the control range of the corresponding control current is 0 to 4095.

In some exemplary embodiments, the length of the base gray scale segment may be shortened by a certain adjustment step size when the uniformity of the base gray scale segment after optical compensation does not meet the preset first uniformity requirement. For example, the adjustment step size may be 2, and the maximum gray scale of the base gray scale segment is reduced by 2 every time it is shortened; or, the minimum gray scale of the base gray scale is increased by 2; or, the maximum gray scale is reduced by 2 and the minimum gray scale is increased by 2 at the same time.

In some exemplary embodiments, detecting whether the uniformity of the base gray scale segment after optical compensation meets the preset first uniformity requirement includes: calculating a uniformity after optical compensation corresponding to each gray scale in the base gray scale segment; and calculating whether a sum of uniformities after optical compensation corresponding to all gray scales in the base gray scale segment is greater than a preset first uniformity threshold, when the sum of the uniformities after optical compensation corresponding to all gray scales in the base gray scale segment is greater than or equal to the preset first uniformity threshold, the uniformity after optical compensation in the base gray scale segment meets the preset first uniformity requirement; when the sum of the uniformities after optical compensation corresponding to all gray scales in the base gray scale segment is less than the preset first uniformity threshold, the uniformity after optical compensation in the base gray scale segment does not meet the preset first uniformity requirement.

In some other exemplary embodiments, detecting whether the uniformity of the base gray scale segment after optical compensation meets the preset first uniformity requirement includes:

calculating a uniformity after optical compensation corresponding to each gray scale in the base gray scale segment;

when the uniformity after optical compensation corresponding to each gray scale in the base gray scale segment is greater than a preset second uniformity threshold, the uniformity after optical compensation in the base gray scale segment meets the preset first uniformity requirement; when one or more of uniformities after optical compensation corresponding to all gray scales in the base gray scale segment are less than the preset second uniformity threshold, the uniformity after optical compensation in the base gray scale segment does not meet the preset first uniformity requirement.

In some exemplary embodiments, calculating a uniformity (which may be a uniformity before optical compensation or uniformity after optical compensation) corresponding to each gray scale includes:

counting occurrence times of brightness corresponding to all sub-pixels under each gray scale to obtain a brightness histogram (abscissa is brightness, from left to right, from all black to all white gradually, and ordinate is the number of sub-pixels);

calculating a brightness average value corresponding to all sub-pixels under each gray scale;

counting the number of sub-pixels in a range of +−z % of the brightness average value in each brightness histogram, and dividing the counted number by the total number of sub-pixels as a uniformity value corresponding to the gray scale.

Exemplarily, z % may be 5%, however embodiments of the present disclosure are not limited thereto.

In some exemplary embodiments, determining the segment parameter lookup table of the display panel includes:

determining one or more non-base gray scale segments;

for each non-base gray scale segment, determining a third target gray scale and a fourth target gray scale of each sub-pixel, wherein the third target gray scale is a gray scale corresponding to full gray scale brightness data closest to the target brightness of the maximum non-base gray scale in the non-base gray scale segment, and the fourth target gray scale is a gray scale corresponding to full gray scale brightness data closest to the target brightness of the minimum non-base gray scale in the non-base gray scale segment; calculating an average value of the third target gray scale and an average value of the fourth target gray scale corresponding to each optical compensation block; calculating a second optical compensation parameter value corresponding to each optical compensation block according to the average value of the third target gray scale and the average value of the fourth target gray scale corresponding to each optical compensation block; traversing a value range of the segment parameter, finding the segment parameter that minimize a sum of differences between the adjusted optical compensation parameters of all sub-pixels and the calculated second optical compensation parameter as the segment parameter corresponding to the non-base gray scale segment.

In some exemplary embodiments, determining one or more non-base gray scale segments includes:

performing optical compensation on the full gray scales and calculating uniformity after optical compensation of the full gray scales by using the full-screen adjustment value and the optical compensation parameter value corresponding to each optical compensation block;

selecting gray scale points whose uniformity values after optical compensation are less than a preset second uniformity threshold;

combining selected continuous gray scale points to obtain one or more non-base gray scale segments.

Taking the above base gray scale segment 0 to 32 as an example, it is assumed that after the full-screen adjustment value and the optical compensation parameter lookup table are obtained, the obtained full-screen adjustment value and the optical compensation parameter lookup table are used to perform the optical compensation on the full gray scales (0 to 255) and calculate the uniformity after optical compensation of the full gray scales (0 to 255), and gray scale points that do not meet the preset uniformity requirements are selected, and selected continuous gray scale points are formed a non-base gray scale segment.

In some other exemplary embodiments, other gray scale segments other than the base gray scale segment may also be directly set as non-base gray scale segments. Taking the aforementioned base gray scale segment 0 to 32 as an example, gray scales 33 to 255 may be directly set as a non-base gray scale segment.

Taking the non-base gray scale segment 33 to 100 as an example, assuming that the target brightness corresponding to gray scale 33 is 320 nits and the target brightness corresponding to gray scale 100 is 450 nit, when the third target gray scale and the fourth target gray scale of each sub-pixel are determined, assuming that for a certain sub-pixel, by traversing the full gray scale brightness data of the sub-pixel (i.e., brightness data corresponding from gray scale 0 to gray scale 255 in one-to-one mode), it is found that, . . . the brightness data corresponding to gray scale 33 is 310 nits, the brightness data corresponding to gray scale 34 is 325 nits, the brightness data corresponding to gray scale 35 is 330 nits, . . . , the brightness data corresponding to gray scale 100 is 440 nits, the brightness data corresponding to gray scale 101 is 453 nits, and the brightness data corresponding to gray scale 102 is 460 nits, . . . , then, since 320 nits is between 310 nits and 325 nits and closer to 325 nits, and 450 nits is between 440 nits and 453 nits and closer to 453 nits, the third target gray scale corresponding to the gray scale 100 of the sub-pixel is 101, and the fourth target gray scale corresponding to the gray scale 33 of the sub-pixel is 34.

Assuming that each optical compensation block includes four sub-pixels, in an optical compensation block where the sub-pixel is located, third target gray scales corresponding to the gray scale 100 of the other three sub-pixels are 102, 100, 105 respectively, and second target gray scales corresponding to gray scale 33 of the other three sub-pixels are 35, 36, 36 respectively. Then the average value of the third target gray scales corresponding to the optical compensation block is [(101+102+100+105)/4]=102, and the average value of the second target gray scales [(34+35+36+36)/4]=35.25.

Assuming that the global adjustment value a obtained in the preceding act is 1.01, is calculation is performed according to the following formula: 102=1.01*100+b1, 35.25=1.01*33+b2, then b1=1 and b2=1. 92 are calculated, and the second optical compensation parameter value b' corresponding to the optical compensation block is b'=(b1+b2)/2=(1+1.92)/2=1. 46 (note: the second optical compensation parameter value b' corresponding to the non-base gray scale segment is only used for intermediate calculation, and will not be stored in the display panel at last). By the same approach, second optical compensation parameter values b' corresponding to all optical compensation blocks are obtained.

Traversing is performed on aa, bb and brisebit, the adjusted b value corresponding to each optical compensation block is calculated: pro_b, pro_b=aa*base_b*(2 brisebit)+bb, where the base_b is the b value corresponding to the optical compensation block in the optical compensation parameter lookup table b 2DLUT corresponding to the base gray scale segment calculated above. The differences between the pro_b of all optical compensation blocks and the alignment position values of the second optical compensation parameters b' corresponding to all optical compensation blocks, a case where a sum of the differences is the smallest, and the corresponding aa, bb and brisebit values are taken as the segment parameters of the non-base gray scale segment.

In the above embodiment, the calculation is based on the actual gray scale values, but in actual use, the calculation may also be carried out by using the control voltage or the control current corresponding to the display panel. For example, assuming that the control bit width of the display panel is 12 bits, the control range of the corresponding control voltage is 0 to 4095 when the display panel is controlled by a 12-bit voltage, and when the display panel is controlled by a 12-bit current, the control range of the corresponding control current is 0 to 4095.

In some exemplary embodiments, the method further includes: for each gray scale, calculating uniformity after optical compensation by using the optical compensation parameter corresponding to the base gray scale segment and the segment parameters corresponding to one or more non-base gray scale segments;

- when the optical compensation parameter corresponding to the base gray scale segment is used to make uniformity of a certain gray scale after optical compensation the best, dividing the gray scale into the base gray scale segment;
- when a segment parameter corresponding to a non-base gray scale segment is used to make uniformity of a certain gray scale after optical compensation the best, dividing the gray scale into the non-base gray scale segment and determining the segment parameter of the gray scale as the segment parameter corresponding to the non-base gray scale segment.

As an example, it is assumed that the optical compensation parameter lookup table corresponding to the base gray scale segment and the segment parameter lookup table corresponding to the three non-base gray scale segments are obtained in the calculation process. In this case, for each gray scale, the optical compensation uniformity calculation is performed by using the optical compensation parameter lookup table corresponding to the base gray scale segment and the segment parameter lookup table corresponding to the three non-base gray scale segments respectively to determine which approach is used to obtain the best optical compensation uniformity, and then the parameters of the best approach are used for subsequent optical compensation of the gray scale.

In some exemplary embodiments, the method further includes: detecting whether the uniformity value after optical compensation corresponding to each gray scale is greater than or equal to a preset second uniformity threshold;

- selecting gray scale points whose uniformity values after optical compensation are less than the preset second uniformity threshold;
- combining selected continuous gray scale points to obtain one or more non-base gray scale segments, and returning to the act of determining the third target gray scale and the fourth target gray scale of each sub-pixel for each non-base gray scale segment to execute.

Figure 3:
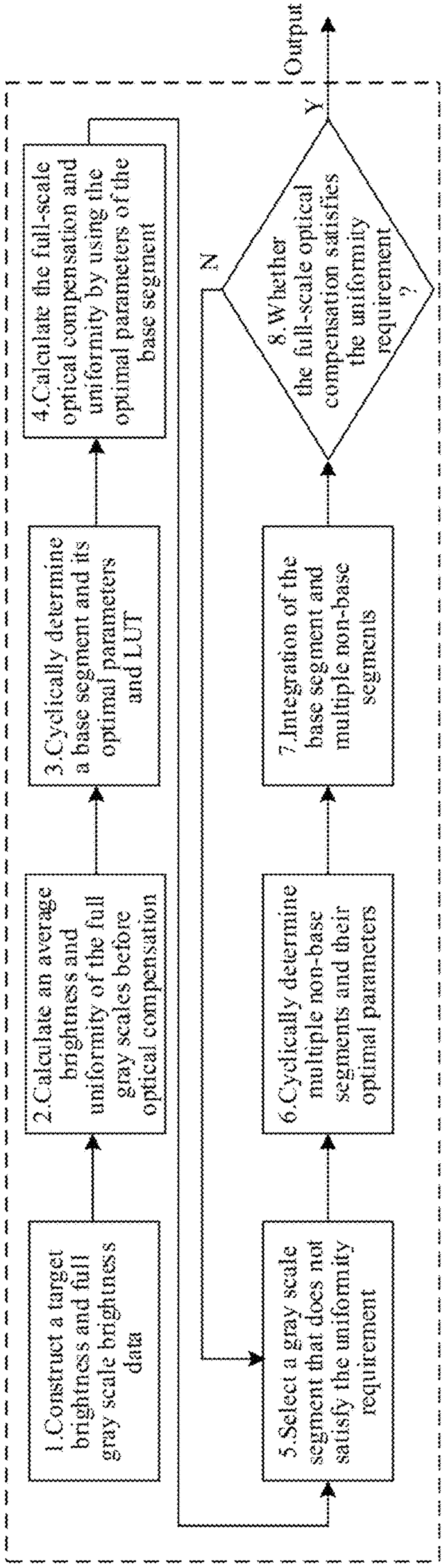
FIG. 3 is a flowchart of an approach for generating segment parameter and optical compensation parameter lookup tables according to an exemplary embodiment of the present disclosure.

FIG. 3 is a flowchart of another method for driving a display panel according to an embodiment of the present disclosure. As shown in FIG. 3, the main acts of the method for driving the display panel of the embodiment of the present disclosure include: selecting a base gray scale segment and multiple non-base gray scale segments, determining an optical compensation parameter of the base gray scale segment, and determining segment parameters aa, bb and brisebit of multiple non-base gray scale segments. Exemplarily, the method for driving a display panel includes the following acts 1 to 6.

1. Constructing a target brightness corresponding to each gray scale and full gray scale brightness data of each sub-pixel (101) Measuring actually Gamma brightnesses of full gray scales, and taking the Gamma brightness of each gray scale as the target brightness of the corresponding gray scale (aim 0, aim 1, . . . , aim 255).

(102) Measuring actually brightness data $test_{gray\_n}$[row][col] of each sub-pixel under multiple gray scales gray_n (e.g. brightness data $test_{50}$[row][col]/$test_{150}$[row][col]/ . . . /$test_{255}$[row][col])] of all pixels under five gray scale 50/150/200/250/255), where the screen resolution is col*row, and each $test_{gray\_n}$[row][coll] stores brightness data for each sub-pixel under gray_n.

(103) Constructing full gray scale brightness data for each sub-pixel in a way of Linear interpolation:

$$\text{Constructed brightness} = \frac{\text{Target gray scale} - \text{Measured small gray scale}}{\text{Measured large gray scale} - \text{Measured small gray scale}} \times \left(\begin{array}{c}\text{Measured large gray scale subpixel brightness} - \\ \text{Measured small gray scale subpixel brightness}\end{array}\right) + \text{Measured small gray scale subpixel brightness}$$

For each sub-pixel, the full gray scales are traversed to determine which two gray scale gray_min/gray_max of the actually measured multiple gray scales gray_n each gray scale gray is between. According to the gray scale segment which the each gray scale belongs to, the full gray scale brightness data of the sub-pixel is constructed in the way of linear interpolation: lv=(gray−gray_min)/(gray_max−gray_min)*($test_{gray\_max}$−$test_{gray\_min}$)+$test_{gray\_min}$.

For example, for the gray scale 100, which is between the actually measured gray scales 50 and 150, for the sub-pixel at col=20, row=10, the corresponding brightness data at the gray scale 100 is lv=(100−50)/(150−50)*($test_{150}$[10][20]-$test_{150}$[10][20])+$test_{50}$[10][20].

2. Calculating the average brightness and uniformity of the full gray scales before optical compensation (201) Traversing all gray scales, and calculating the average value of brightness data of all sub-pixels under each gray scale.

(202) Traversing all gray scales, and calculating uniformity before optical compensation corresponding to each gray scale.

All gray scales are traversed, occurrence times of brightnesses of all sub-pixels under each gray scale are counted to obtain a brightness histogram (abscissa is brightness, ordinate is the number of sub-pixels). The brightness average value of all sub-pixels under each gray scale is calculated. The number of sub-pixels in the range of +−5% of the corresponding average brightness in each brightness histogram is counted and divided by the total number of sub-pixels as the uniformity value before optical compensation under the gray scale.

In some exemplary embodiments, the method further includes: calculating original uniformity of the panel according to the uniformity before optical compensation corresponding to each gray scale; exemplarily, the original uniformity of the panel may be an average or a weighted average of the uniformities before optical compensation corresponding to all gray scales, however embodiments of the present disclosure are not limited thereto; when the original uniformity of the panel is higher than a preset uniformity threshold, performing compensation by using a compensation approach of slope temp_gray=a*gray; and when the original uniformity of the panel is lower than the preset uniformity threshold, performing compensation by using a comprehensive compensation approach of slope+intercept temp_gray=a*gray+pro_b.

In an embodiment of the present disclosure, when the original uniformity of the panel is good, for example, greater than 70%, the brightness difference between sub-pixels is small, and a better compensation effect can be obtained only by using the compensation approach of slope temp_gray=a*gray. When the original uniformity of panel is poor, for example, less than 70%, the brightness difference between sub-pixels is large, and the comprehensive compensation approach of slope+intercept, temp_gray=a*gray+pro_b, can obtain better compensation effect. The following description is made by taking the comprehensive compensation approach of slope+intercept as an example.

Figure 4:
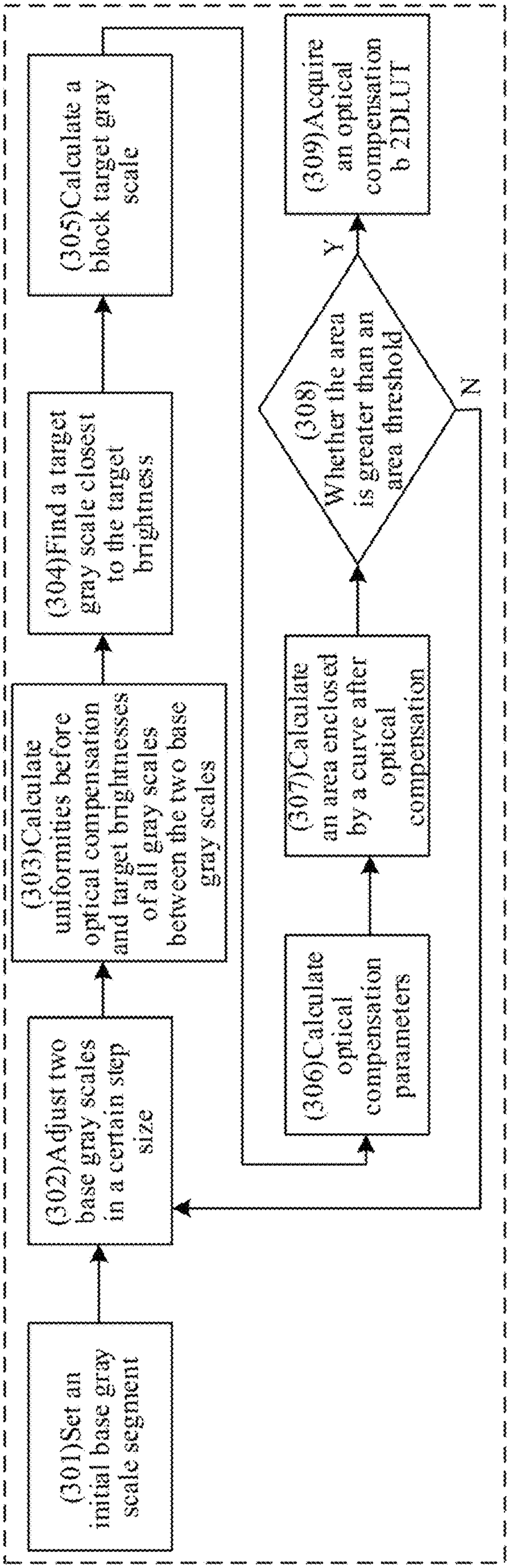
FIG. 4 is a detailed flowchart of the act of cyclically determining a base gray scale segment and its optimal parameters in FIG. 3.

3. Cyclically determining the base gray scale segment and its optimum parameters and LUT FIG. 4 is a detailed flowchart of the acts in FIG. 3 for cyclically determining the base gray scale segment and its optimal parameters and LUT. As shown in FIG. 4, the cyclically determining of the base gray scale segment and its optimal parameters and LUT includes the following acts:

(301) An initial base gray scale segment is set. Refer to the user's requirements, a gray scale segment with the strictest uniformity requirement is set as an initial base gray scale segment (gray_s~gray_e). For example, if the customer is more concerned about uniformity below gray scale 32, gray scales 0-32 are set as the initial base gray scale segment.

(302) gray_s and gray_e are set as the minimum and maximum gray scales in the initial base gray scale segment, and two base gray scales are adjusted in a certain step size: gray0=gray_s+num*inter, gray1=gray_e−num*inter.

Herein, num is an adjustment amount and its initial value is 0; inter is an adjustment step size, and for example, the value of inter is 2.

(303) Uniformities before optical compensation and target brightnesses of all gray scales between the two base gray scales gray0 and gray1 are calculated.

When the uniformities before optical compensation of all gray scales between two base gray scales are calculated, the brightness data of each sub-pixel under full gray scales has been constructed in the preceding act, and the uniformities before optical compensation are calculated according to the brightness data of each sub-pixel under all gray scales. When the target brightnesses of full gray scales between two base gray scales are calculated, the Gamma brightnesses of full gray scales have been measured actually in the aforementioned act, and the Gamma brightness corresponding to each gray scale is the target brightness of each gray scale.

(304) A target gray scale close_vdata0 for a base gray scale gray0 and a target gray scale close_vdata1 for a base gray scale gray1 for each sub-pixel are found.

The target brightness corresponding to the base gray scale gray0 is denoted as aim0, and the target brightness corresponding to the base gray scale gray1 is denoted as aim1.

For each sub-pixel, the full gray scale brightness data $lv_{gray}$ of the sub-pixel is traversed to find a situation that satisfies $lv_{gray\_m1}$<=aim0<$lv_{gray\_m2}$, the brightness data closer to aim0 in $lv_{gray\_m1}$ and $lv_{gray\_m2}$ is selected as an actual target brightness of the base grayscale gray0; meanwhile, gray scale gray m1 or gray m2 corresponding to the actual target brightness is selected as the target gray scale close_vdata0 of the sub-pixel.

For each sub-pixel, the full gray scale brightness data $lv_{gray}$ of the sub-pixel is traversed to find a situation that satisfies $lv_{gray\_m3}$<=aim1>$lv_{gray\_m4}$, the brightness data closer to aim1 in $lv_{gray\_m3}$ and $lv_{gray\_m4}$ is selected as an actual target brightness of the base grayscale gray1; meanwhile, gray scale gray m3 or gray m4 corresponding to the actual target brightness is selected as the target gray scale close_vdata1 of the sub-pixel.

(305) Average values block_vdata0 and block_vdata1 of the target gray scales close_vdata0 and close_vdata1 in each optical compensation block are calculated.

According to the target gray scale close_vdata0 of each sub-pixel, the average value of target gray scales close_vdata0 of all sub-pixels in each optical compensation block is calculated and denoted as block_vdata0.

According to the target gray scale close_vdata1 of each sub-pixel, the average value of all target gray scales close_vdata1 in each optical compensation block is calculated and denoted as block_vdata1.

(306) Values of the optical compensation parameters a and b are calculated. (gray0, block_vdata0) and (gray1, block_vdata1) are put into block_vdata=a*base_vdata+b, to obtain the values of a and b.

(307) An area enclosed by the uniformity curve after optical compensation is calculated. Partition fixed-point optical compensation is performed by using demura_gray=a*gray+b. The gray scale after optical compensation is converted into brightness data; the uniformity after optical compensation is calculated; and the area enclosed by the uniformity curve after optical compensation is calculated.

(308) Whether the area enclosed by the uniformity curve after optical compensation is larger than a preset uniformity area threshold is determined. When the area enclosed by the uniformity curve after optical compensation is greater than or equal to the preset uniformity area threshold, the procedure proceeds to act (309); when the area enclosed by the optical compensation uniformity curve is less than the preset uniformity area threshold, numb ++ is performed, and then the process proceeds to act (302).

(309) An optical compensation parameter lookup table is formed. The b values of all optical compensation blocks obtained by calculation in act (307) to form an optical compensation parameter lookup table b 2DLUT.

4. Perform partition fixed-point optical compensation and the uniformity calculation of optical compensation for the full gray scales by using the lookup table of optical compensation parameters in the base gray scale segment.

(401) Partition fixed-point optical compensation is performed on the full gray scale segment by using the optical compensation parameter lookup table obtained in the preceding act, where aa=1, bb=0 and brisebit=0.

(402) Uniformity calculation is performed. The full gray scale segment is traversed, the brightness histogram of brightness data under each gray scale is calculated, the number of sub-pixels in a range of +−5% of a corresponding brightness average is counted, and is divided by the total number of sub-pixels, to obtain the uniformity after optical compensation of the corresponding gray scale.

5. The gray scale points whose uniformities after optical compensation are less than a preset uniformity threshold are selected, and selected continuous gray scale points are combined to obtain one or more non-base gray scale segments.

All gray scale points whose uniformities after optical compensation are less than the preset uniformity threshold are selected, and selected adjacent gray scale points are divided into one segment, and the non-adjacent gray scale points are divided into different segments, to obtain one or more non-base gray scale segments.

Through the above acts 4 and 5, one or more non-base gray scale segments may be selected. In some other exemplary embodiments, gray scale segments other than the base gray scale segment determined in act 3 may also be directly set as non-base gray scale segments.

6. The segment parameters of multiple non-base gray scale segments are cyclically determined.

(601) For each non-base gray scale segment, gray_s2 and gray_e2 are set as the minimum gray scale and the maximum gray scale within the non-base gray scale segment, and two non-base gray scales are adjusted in a certain step size: gray2=gray_s2+num*inter, gray3=gray_e2−num*inter.

Herein, num is an adjustment amount and an initial value is 0; inter is an adjustment step size, and for example, the value of inter is 2.

(602) The uniformities before optical compensation and target brightnesses of all gray scales between the two non-base gray scales gray2 and gray3.

When the uniformities before optical compensation of all gray scales between two non-base gray scales are calculated, the brightness data of each sub-pixel under full gray scales has been constructed in the preceding acts, and the uniformity before optical compensation is calculated according to the brightness data of each sub-pixel under all gray scales. When the target brightnesses of full gray scales between two non-base gray scales are calculated, the Gamma brightnesses of full gray scales have been measured actually in the aforementioned acts, and the Gamma brightness corresponding to each gray scale is the target brightness of each gray scale.

(603) A target gray scale close_vdata2 for non-base gray scale gray2 and a target gray scale close_vdata3 for non-base gray scale gray3 for each sub-pixel are found.

The target brightness corresponding to the non-base gray scale gray2 is denoted aim2, and the target brightness corresponding to the non-base gray scale gray3 is denoted as aim3.

For each sub-pixel, the full gray scale brightness data lvgray of the sub-pixel is traversed to find a situation that satisfies lvlvgray_m5<=aim2<lvlvgray_m6, brightness data closer to aim2 in $lv_{gray\_m5}$ and $lv_{gray\_m6}$ is selected as an actual target brightness of the non-base grayscale gray2; meanwhile, gray scale gray m5 or gray m6 corresponding to the actual target brightness is selected as the target gray scale close_vdata2 of the non-base gray scale gray2 for the sub-pixel.

For each sub-pixel, the full gray scale brightness data lvgray of the sub-pixel is traversed to find a situation that satisfies lvlvgray_m7<=aim3<lvlvgray_m8, brightness data closer to aim3 in $lv_{gray\_m7}$ and $lv_{gray\_m8}$ is selected as an actual target brightness of the base grayscale gray3; meanwhile, gray scale gray m7 or gray m8 corresponding to the actual target brightness is selected as the target gray scale close_vdata3 of the non-base gray scale gray3 for the sub-pixel.

(604) Average values block_vdata2 and block_vdata3 of the target gray scales close_vdata2 and close_vdata3 in each optical compensation block are calculated.

According to the target gray scale close_vdata2 of each sub-pixel, an average value of target gray scales close_vdata2 of all sub-pixels in each optical compensation block is calculated and denoted as block_vdata2.

According to the target gray scale close_vdata3 of each sub-pixel, an average value of all target gray scales close_vdata3 in each optical compensation block is calculated and denoted as block_vdata3.

(605) The b value corresponding to each optical compensation block is calculated: (gray3, block_vdata3) is put into block_vdata=a*base_vdata+b1 for calculation to obtain a value of b1; (gray4, block_vdata4) is put into block_vdata=a*base_vdata+b2 for calculation to obtain a value of b2; The average value of b1 and b2 is calculated and denoted as the corresponding b value of each optical compensation block.

(606) An area enclosed by the uniformity curve after optical compensation is calculated. Partition fixed-point optical compensation is performed by using demura_gray=a*gray+b; the gray scale after optical compensation is converted into brightness data; the uniformity after optical compensation is calculated; and the area enclosed by the uniformity curve after optical compensation is calculated.

(607) Whether the area enclosed by the uniformity curve after optical compensation is larger than a preset uniformity area threshold is determined. When the area enclosed by the uniformity curve after optical compensation is greater than or equal to the preset uniformity area threshold, the procedure proceeds to act (608); when the area enclosed by the optical compensation uniformity curve is less than the preset uniformity area threshold, numb ++ is performed, and then the process proceeds to act (601).

(608) An optical compensation parameter lookup table of a non-base gray scale segment is formed. The b values of all optical compensation blocks calculated in act (605) are integrated to form a second optical compensation parameter lookup table b' 2DLUT of the non-base gray scale segment (note that the second optical compensation parameter lookup table of the non-base gray scale segment is not finally stored in the display panel and is only used as an intermediate quantity for calculation).

(609) Each non-base segment of each sub-pixel is traversed, the aa/bb/brisebit values of the corresponding sub-pixel in a corresponding non-base segment are calculated.

<1> The range of values of aa, bb, and brisebit is traversed to calculate the adjusted b value.

The adjusted b value is calculated through pro_b=aa*base_b*(2 ^brisebit)+bb, wherein, the base_b is the b value corresponding to the optical compensation block in the optical compensation parameter lookup table b 2DLUT corresponding to the base gray scale segment obtained by calculation in act 3; and a pro_b value is obtained for each sub-pixel in each non-base segment.

In actual use, the value ranges of aa, bb and brisebit are set according to the maximum brightness and Gamma value of the display panel. For example, when the maximum brightness of the display panel is between 500 nits and 1000 nits and the Gamma value is between 2.2±0.3, the value range of aa is between 0 and 15, the value range of bb is between −4095 and 4095, and the value range of brisebit is between 0 and 9.

<2> The differences between the pro_b of all sub-pixels and the values of the alignment positions in the optical compensation parameter lookup table b 2DLUT of the non-base gray scale segment are calculated.

<3> A case where a sum of the differences is the smallest, and the corresponding aa, bb and brisebit values are used as the segment parameters of the non-base gray scale segment.

So far, the optical compensation parameter lookup table corresponding to the base gray scale segment and the segment parameter lookup table corresponding to the non-base gray scale segment are obtained. In some exemplary embodiments, the method for driving a display panel may further include the following acts 7-8.

7. Integration of the base gray scale segment and multiple non-base gray scale segments is performed.

The full gray scale optical compensation and uniformity calculation are performed by using the optical compensation parameter of the base gray scale segment and the segment parameters of multiple non-base gray scale segments respectively, a case where the best uniformity under the same gray scale is selected, and the gray scales that are adjacent and belong to the same base gray scale segment or non-base gray scale segment are integrated, so that the initial segment results may be obtained.

In this act, for each gray scale, optical compensation is not only performed according to the optical compensation parameters of the base gray scale segment, but also performed according to the segment parameters of each non-base gray scale segment, and a case with the best uniformity among all the optical compensation cases is selected. If the best uniformity is obtained by optical compensation according to the optical compensation parameters of the base gray scale segment, then the gray scale is divided into the base gray scale segment. If the best uniformity is obtained by optical compensation according to the segmented parameters of a certain non-base gray scale segment, then the gray scale is divided into that non-base gray scale segment. Through this act, the integrated base gray scale segment and/or non-base gray scale segment are obtained (if the best uniformity can be obtained by optical compensation using segment parameters of non-base gray scale segment for gray scale 0 to gray scale 255, gray scale 0 to gray scale 255 are divided into the non-base gray scale segment).

8. Optical compensation uniformity of full gray scales is determined.

According to the segment situation of each gray scale (belonging to the base gray scale segment/a certain non-base gray scale segment), the corresponding uniformity after optical compensation is calculated. Taking all gray scale values as abscissas and uniformity of each gray scale as ordinate, a uniformity curve after optical compensation may be obtained. The uniformity curve after optical compensation is traversed to detect whether there is a gray scale point whose uniformity after optical compensation is less than the preset uniformity threshold. When there is still a gray scale point whose uniformity is less than the preset uniformity threshold, the procedure proceeds to act 5. When the uniformities of all gray scales after optical compensation is greater than or equal to the preset uniformity threshold, a gray scale segment division result, optical compensation parameter lookup table and segment parameter lookup table at this time are output.

According to the method for driving a display panel of the embodiment of the present disclosure, through multiple iterative calculations, a gray scale segment division with better optical compensation effect of full gray scales, an optical compensation parameter lookup table b 2DLUT of a base gray scale segment, and segment parameter lookup tables corresponding to a non-base gray scale segment: gray2aa 1DLUT, gray2bb 1DLUT and gray2brisebit 1DLUT may be obtained. The method for driving a display panel of the embodiment of the present disclosure may not only take into account the brightness distribution difference characteristics of different gray scale segments to ensure the optical compensation effect of full gray scales and improve the display image quality, but also greatly reduce the storage amount of hardware parameters and reduce the hardware implementation cost. In the embodiment of the present disclosure, when the display panel includes a first sub-pixel displaying a first color, a second sub-pixel displaying a second color and a third sub-pixel displaying a third color, respective optical compensation parameter lookup tables and segment parameter lookup tables may be respectively obtained for the first sub-pixel, the second sub-pixel and the third sub-pixel. Alternatively, the second color and/or the third color with low human eye sensitivity are not compensated according to the human eye color sensitivity requirement (the non-human eye gaze region may not be compensated), or the hardware storage amount and hardware region can be reduced without affecting the uniformity of the display panel.

In this embodiment, when the comprehensive compensation approach of slope+intercept is adopted for compensation, the value of the optical compensation parameter b is first adjusted.

The optical compensation parameter b is adjusted by using the segment parameter values of the corresponding gray scale segment obtained in the above act 3: values of aa, bb and brisebit:

$$\text{pro\_b} = aa*b*(2^{\wedge}brisebit)+bb.$$

Because the brightness distribution characteristics of different gray scale segments are different, in order to achieve better uniformity, different gray scale segments need different optical compensation parameters. Based on the principle that only the base segment optical compensation parameter lookup table b 2DLUT is saved, the optical compensation parameter pro_b which more matches the corresponding gray scale may be obtained by performing adjustment on the base segment optical compensation parameter b in combination with the value range (brisebit), slope (aa) and intercept (bb) of the above formula.

Then the optical compensation is carried out according to the following formulas, and the upper and lower limits of optical compensation are limited:

$$\text{temp\_gray} = a*\text{gray}+\text{pro\_b},$$

$$\text{demura\_gray} = \min(\max(\text{temp\_gray}, \text{min\_gray}), \text{max\_gray}).$$

Herein a is the full-screen a value, that is, all sub-pixels use this a value and the corresponding sub-pixel pro_b value for optical compensation, which can also effectively reduce the parameter storage; min_gray and max_gray are the upper and lower gray scale limits, for example, the upper and lower limits of 8 bit screen are 0 and 255; demura_gray is the final gray scale value after optical compensation. The non-uniformity of the entire screen lightened by the same gray can be improved by the screen lightened by demura_gray grays, wherein the demura_gray corresponds to each sub-pixel.

In some other exemplary embodiments, when the original uniformity of the panel is good, for example, greater than 70%, the brightness difference between the sub-pixels is small, and a better compensation effect can be obtained by only using the slope compensation approach, i.e., temp_gray=a*gray.

Exemplarily, when compensation is performed using a slope compensation approach, optical compensation is performed and the upper and lower limits of optical compensation are limited using the following formulas:

$$\text{temp\_gray} = a*\text{gray},$$

-continued $$\text{demura\_gray} = \min(\max(\text{temp\_gray}, \text{min\_gray}), \text{max\_gray}).$$

Herein a is the full-screen a value, that is, all sub-pixels use this a value for optical compensation, which can effectively reduce the parameter storage; min_gray and max_gray are the gray scale upper and lower limits, for example, the upper and lower limits of 8 bit screen are 0 and 255; demura_gray is the final gray scale value after optical compensation. The non-uniformity of the entire screen lightened by the same gray can be improved by the screen lightened by demura_gray grays, wherein the demura_gray corresponds to each sub-pixel.

When the slope compensation approach is used for compensation, the approach to determine the full-screen adjustment value a is as follows:

- constructing the target brightness corresponding to each gray scale and the full gray scale brightness data of each sub-pixel (see act 1 above for the specific process);
- setting the initial base gray scale segment (see act 301 above for the specific process);
- adjusting two base gray scales in a certain step size (see act 302 above for the specific process);
- calculating the uniformities before optical compensation and target brightnesses of all gray scales between the two base gray scales gray0 and gray1 (see act 303 above for the specific process);
- finding a target gray scale close_vdata0 for the base gray scale gray0 and a target gray scale close_vdata1 for the base gray scale gray1 for each sub-pixel (see act 304 above for the specific process);
- calculating average values block_vdata0 and block_vdata1 of the target gray scales close_vdata0 and close_vdata1 in each optical compensation block (see act 305 above for the specific process);
- calculating a value of a global adjustment value a by putting (gray0, block_vdata0) and (gray1, block_vdata1) into block_vdata=a*base vdata to obtain two values of a, and taking an average value of the obtained two values of a as the value of the global adjustment value a;
- calculating an area enclosed by the uniformity curve after optical compensation: using demura_gray=a*gray for global optical compensation; converting the gray scale after optical compensation into brightness data; calculating the uniformity after optical compensation; and calculating the area enclosed by the uniformity curve after optical compensation;
- determining whether the area enclosed by the uniformity curve after optical compensation is larger than a preset uniformity area threshold. when the area enclosed by the uniformity curve after optical compensation is greater than or equal to the preset uniformity area threshold, outputting the value of the global adjustment value a; when the area enclosed by the uniformity curve after optical compensation is less than the preset uniformity area threshold, performing num ++, and then proceeding to the act of adjusting two base gray scales in a certain step size to continue execution.

In some exemplary embodiments, according to a human eye color sensitivity requirement, a first sub-pixel displaying a first color that is more sensitive to the human eye may be compensated by using a comprehensive compensation approach of slope+intercept, and a second sub-pixel and/or a third sub-pixel displaying a second color and/or a third color that is less sensitive to the human eye may be compensated by using a slope compensation approach or not be compensated, thereby reducing hardware storage and hardware area without affecting the uniformity of the display panel.

In some other exemplary embodiments, according to a human eye color sensitivity requirement, a first sub-pixel displaying a first color that is more sensitive to the human eye may be compensated using a compensation approach of slope, and a second sub-pixel and/or a third sub-pixel displaying a second color and/or a third color that is less sensitive to the human eye may not be compensated.

Figure 5:
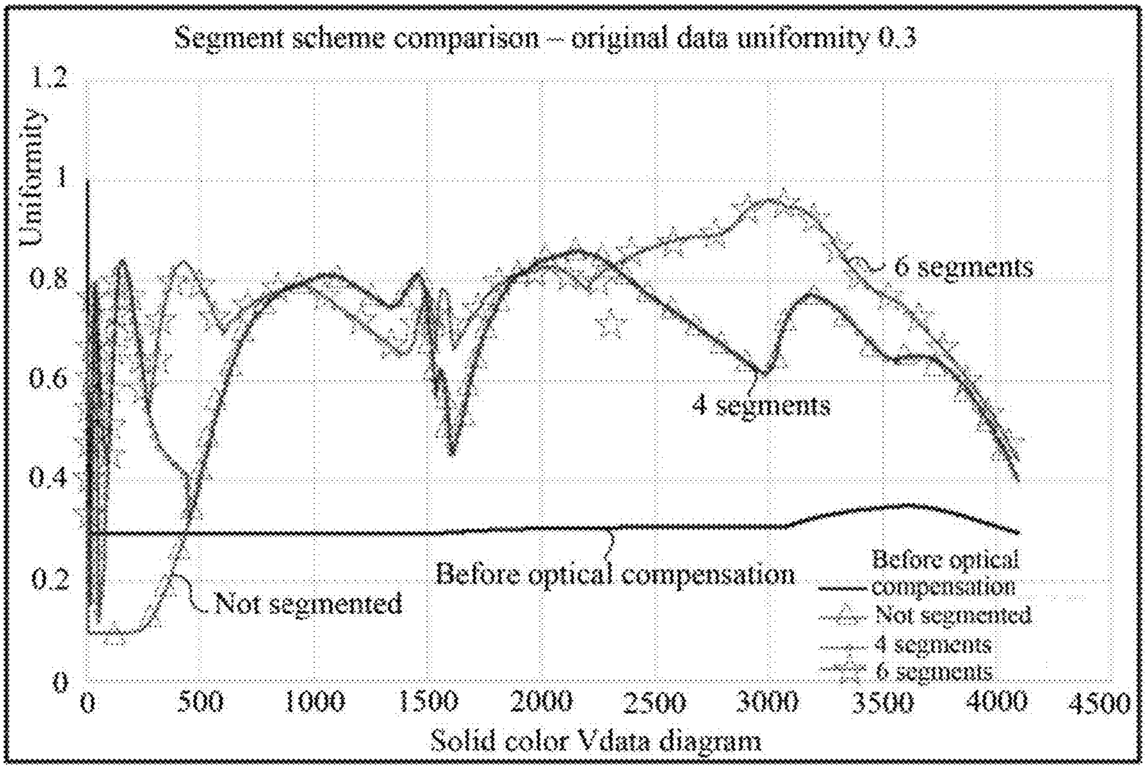
FIG. 5 and FIG. 6 are schematic diagrams of uniformity effects after optical compensation in different segments when the uniformities of original data are 0.3 and 0.5 respectively.
Figure 6:
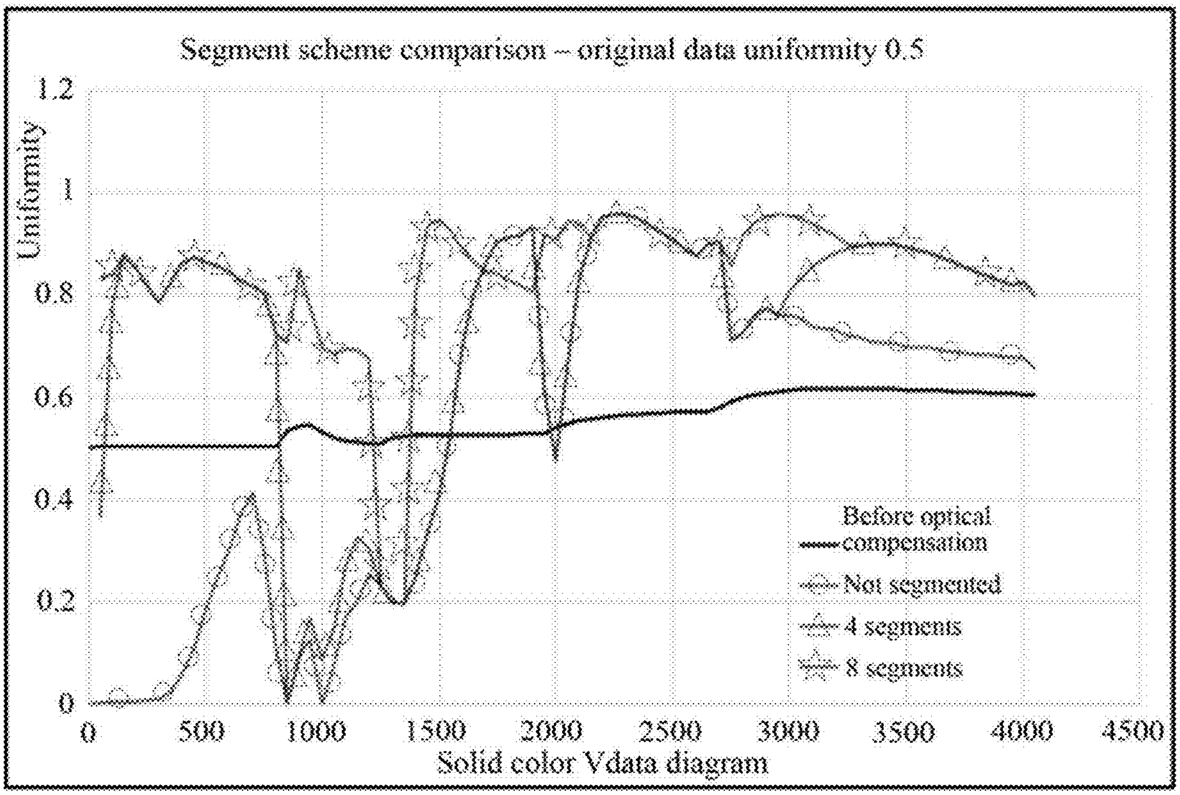

FIGS. 5 and 6 are schematic diagrams of uniformity effects after optical compensation in different segments when the uniformity of original data is 0.3 and 0.5 respectively (both are compensated by the comprehensive compensation approach of slope+intercept), in which the abscissa represents the control voltage Vdata. Since the display panel is controlled by the 12-bit width control voltage Vdata (the embodiment of the present disclosure does not limit this bit width), the value range of the control voltage Vdata is 0 to 4095, and the solid color Vdata diagram indicates that the screen picture used for point screen test is a solid color diagram (the display gray scale of each sub-pixel is the same). When the control voltage Vdata takes different values, the corresponding display gray scales of the display panel take different values.

As can be seen from FIGS. 5 and 6, the optical compensation effect of the full gray scales by segment optical compensation is better than that by non-segmented optical compensation; the more the number of segments, the better the uniformity of optical compensation in the full gray scales; and the rules are the same under different original data uniformities. In actual use, the appropriate number of segments may be adopted according to the requirements of actual projects for screen uniformity, design permission of hardware parameter storage and computational complexity requirements.

Figure 7:
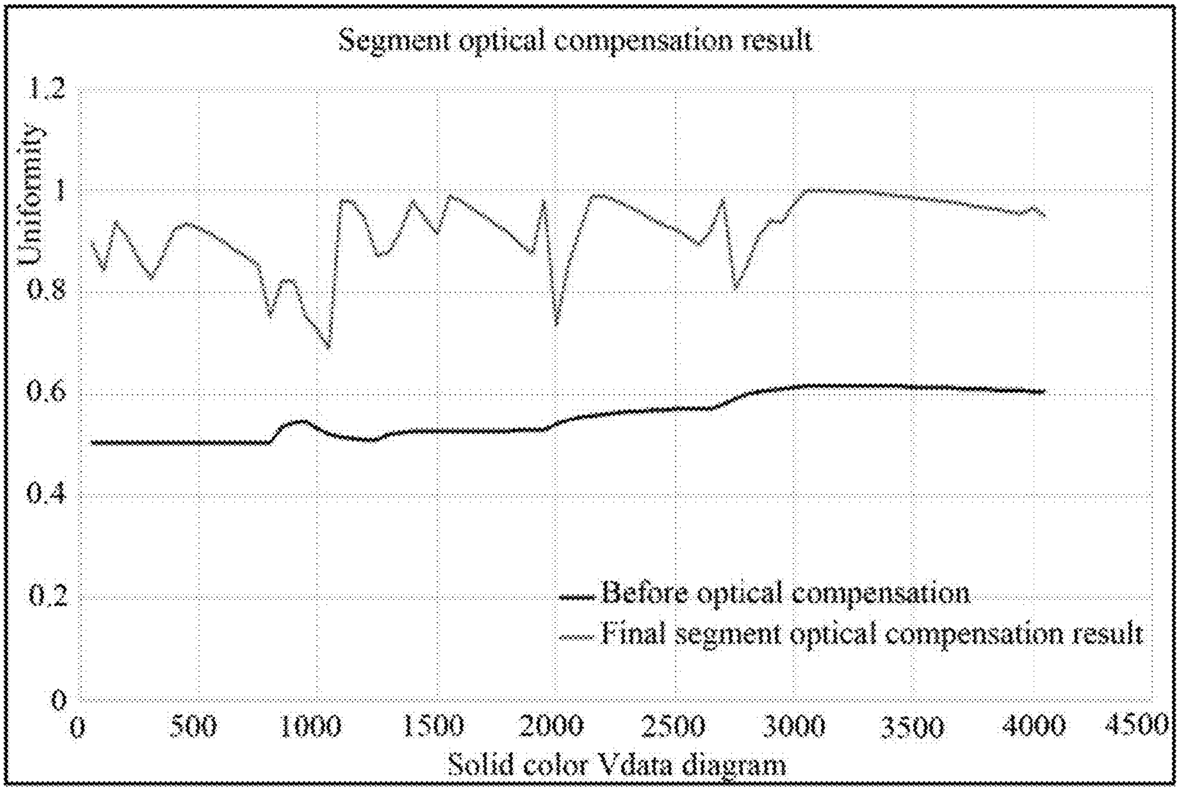
FIG. 7 is a schematic diagram of a uniformity result after optical compensation according to an embodiment of the present disclosure.
Figure 8A:
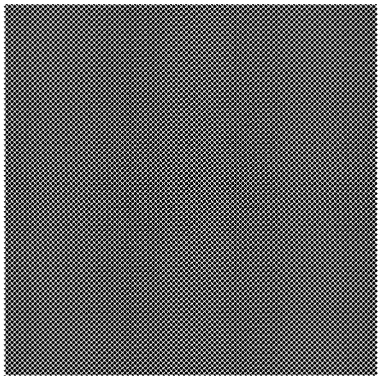
FIG. 8A and FIG. 8B are schematic diagrams of overall screen display effects before and after optical compensation according to an embodiment of the present disclosure.
Figure 8B:
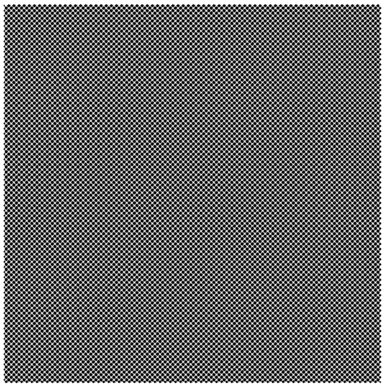
Figure 8C:
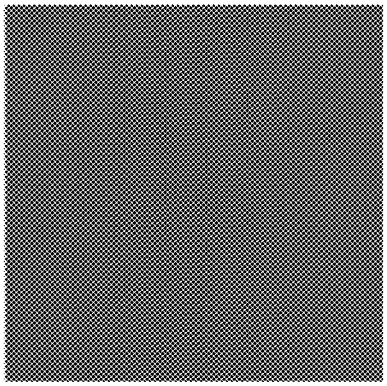
FIG. 8C and FIG. 8D are schematic diagrams of partial screen display effects before and after optical compensation according to an embodiment of the present disclosure.
Figure 8D:
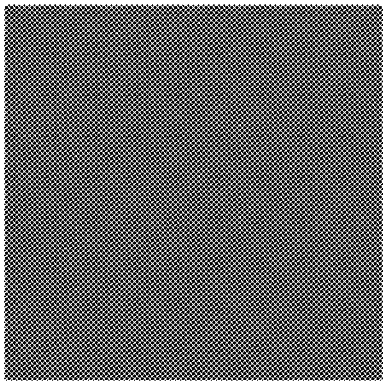

In some exemplary embodiments, a 10-segment optical compensation scheme (b 2DLUT+aa/bb/brisebit adjustment) is generated by the method for driving a display panel of the embodiment of the present disclosure for optical compensation simulation verification. Table 4 is a calculated segment parameter lookup table. FIG. 7 is a schematic diagram of a uniformity result after optical compensation according to an embodiment of the present disclosure. FIG. 8A and FIG. 8B are schematic diagrams of overall screen display effects before and after optical compensation according to an embodiment of the present disclosure. FIG. 8C and FIG. 8D are schematic diagrams of partial screen display effects before and after optical compensation according to an embodiment of the present disclosure. As shown in FIG. 7, on the whole, the uniformities of the full gray scales after optical compensation have been greatly improved, and the uniformity after optical compensation has changed from 50%~60% to 80% 100%. Only a few gray scale points after optical compensation have uniformity around 75%, but the uniformity has also been improved compared to the uniformity before optical compensation to some extent. As shown in FIG. 8A and FIG. 8B, on the whole, there are two obvious shadow bands in the original image. After the 10-segment optical compensation scheme is performed, the two shadow bands are compensated to be basically consistent with the surrounding region in brightness, and finally the shadow bands disappear, and the uniformity of the whole image is greatly improved after optical compensation. In addition, as shown in FIGS. 8C and 8D, from a partial region, the non-uniformity phenomenon of mottled regions before optical compensation is also greatly improved after 10-segment optical compensation, and the subjective visual effect is more uniform. Therefore, the effectiveness of the optical compensation scheme of the embodiment of the present disclosure can be effectively proved, and at the same time, less hardware storage can be occupied.

TABLE 4

| Gray | aa | bb | brisebit |
|---|---|---|---|
| 0 | 3 | −9 | 0 |
| 150 | 5.6 | −16 | 0 |
| 350 | 3.8 | −44 | 2 |
| 850 | 1.8 | 18 | 0 |
| 1250 | 2 | 26 | 0 |
| 1400 | 2.2 | 8 | 2 |
| 1750 | 9.6 | 18 | 0 |
| 2150 | 1 | 0 | 4 |
| 2750 | 5 | 8 | 2 |
| 3300 | 7.4 | −15 | 2 |

In some exemplary embodiments, the method further includes: smoothing segment parameters of non-base gray scale segments adjacent to the base gray scale segment to effectively attenuate segment traces.

Exemplarily, the first segment parameter, the second segment parameter, and the third segment parameter of the base gray scale segment are respectively $aa_{base}$, $bb_{base}$ and $brisebit_{base}$.

The first segment parameters, the second segment parameters and the third segment parameters of the left and right non-base gray scale segments adjacent to the base gray scale segment respectively are $aa_{nonbase1}$, $bb_{nonbase1}$, $brisebit_{nonbase1}$ and $aa_{nonbase2}$, $bb_{nonbase2}$, $brisebit_{nonbase2}$.

Smoothing the segment parameters of the non-base gray scale segments adjacent to the base gray scale segment includes: performing weighted averaging by using first segment parameters, second segment parameters and third segment parameters of the base gray scale segment and adjacent non-base gray scale segments:

$$aa_{nonbase1\_final} = p1 * aa_{base} + q1 * aa_{nonbase1};$$

$$aa_{nonbase2\_final} = p2 * aa_{base} + q2 * aa_{nonbase2};$$

$$bb_{nonbase1\_final} = p1 * bb_{base} + q1 * bb_{nonbase1};$$

$$bb_{nonbase2\_final} = p2 * bb_{base} + q2 * bb_{nonbase2};$$

$$brisebit_{nonbase1\_final} = p1 * brisebit_{base} + q1 * brisebit_{nonbase1};$$

$$brisebit_{nonbase2\_final} = p2 * brisebit_{base} + q2 * brisebit_{nonbase2};$$

Herein, p1, q1, p2 and q2 are weighted coefficients for smoothing processing, which are used to control the smoothing degree of the base gray scale segment and adjacent non-base gray scale segments, p1+p2=1, q1+q2=1.

At this time, the final first segment parameters, second segment parameters and third segment parameters of two non-base gray scale segments adjacent to the base gray scale segment may be obtained. Parameter segment smoothing can make the optical compensation effects of base gray scale segment and non-base gray scale segments smoother and more natural.

In some exemplary embodiments, the method further includes smoothing the partition optical compensation parameters to effectively attenuate partition traces.

Parameter partition smoothing requires the optical compensation parameter lookup table b 2DLUT, which is a two-dimensional lookup table corresponding to the block-level optical compensation parameter b value. For example, for a screen with 3840*3840 resolution, if 4*4 pixels are used as an optical compensation block, b 2DLUT is 960 columns*960 rows.

Figure 9A:
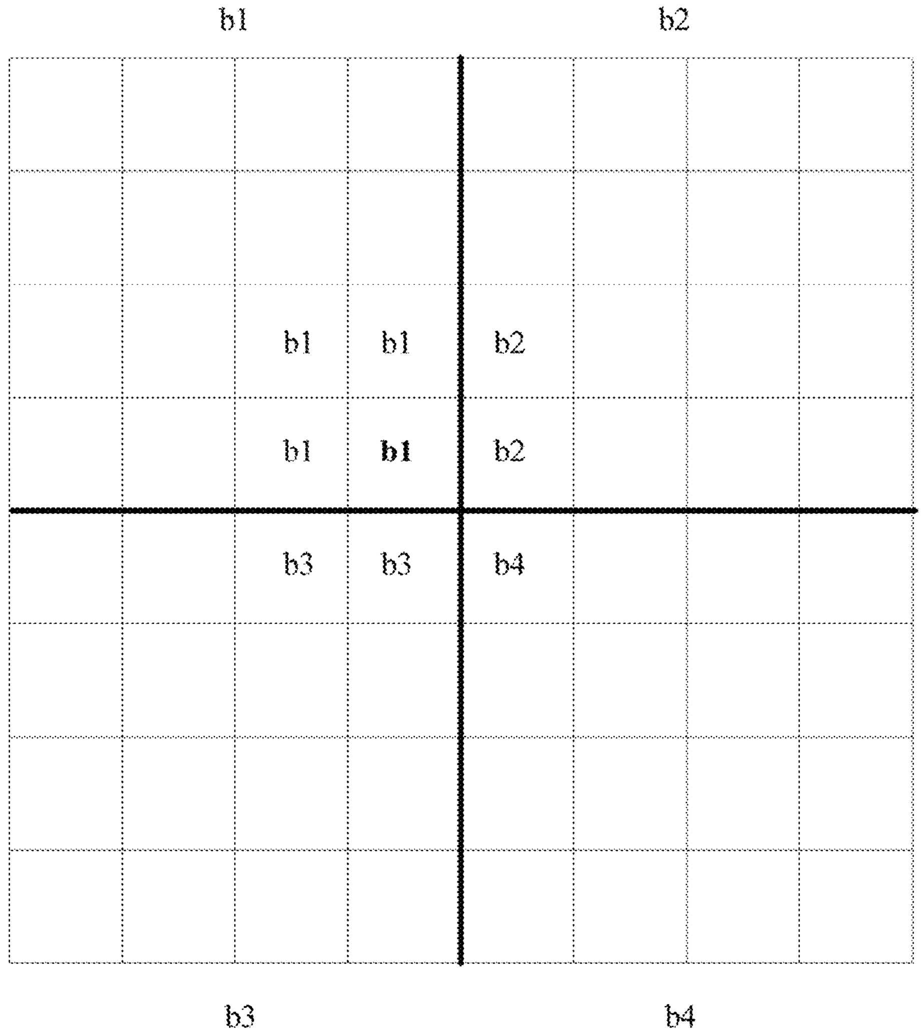
FIG. 9A is a schematic diagram of an optical compensation block division structure according to an exemplary embodiment of the present disclosure.
Figure 9B:
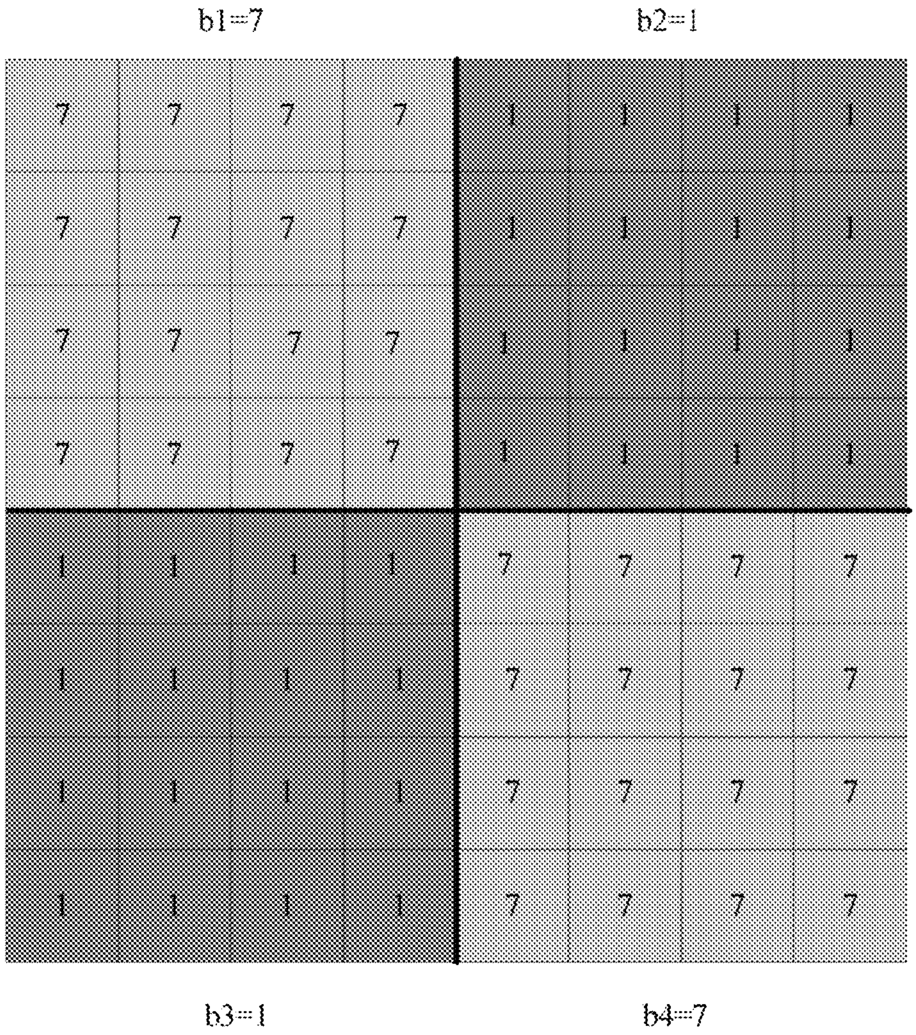
FIG. 9B is a schematic diagram of optical compensation parameters before partition smoothing of a display panel according to an exemplary embodiment of the present disclosure.
Figure 9C:
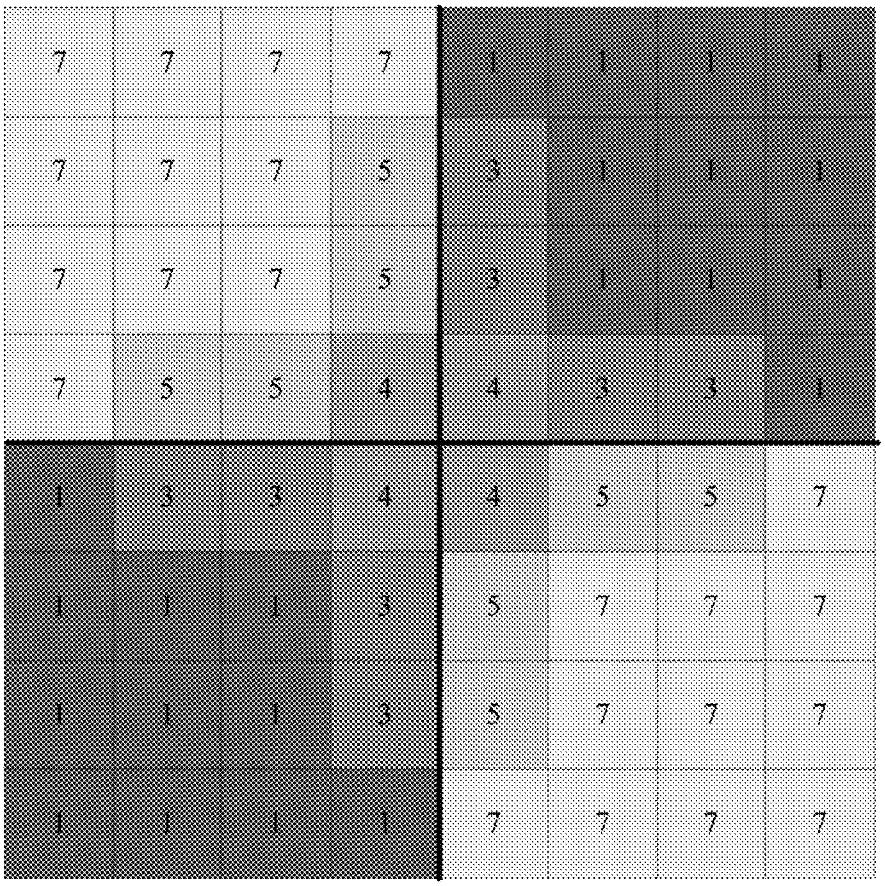
FIG. 9C is a schematic diagram of optical compensation parameters after partition smoothing of a display panel according to an exemplary embodiment of the present disclosure.

The optical compensation parameter b is filtered for smoothing by using the side_filter*side_filter region, and FIGS. 9A to 9C are illustrated by taking 3*3 region filtering and 4*4 sub-pixels as an optical compensation block as an example. For each sub-pixel, a 3*3 neighborhood region corresponding to the sub-pixel is demarcated, and then the optical compensation blocks (lut_x, lut_y) where nine points in the 3*3 neighborhood are located and the optical compensation parameters b of the corresponding blocks are obtained.

For example, for a sub-pixel in FIG. 9A, the 3*3 neighborhood centered on this point has been marked with corresponding optical compensation parameters, and the optical compensation blocks (lut_x, lut_y) where these nine sub-pixels are located are obtained respectively:

$$\text{lut\_y} = \text{floor}(\text{panel\_yn}/\text{block\_row}),$$

$$\text{lut\_x} = \text{floor}(\text{panel\_xn}/\text{block\_col}).$$

Herein, (panel_x, panel_y) is a position coordinate of a sub-pixel on a panel, (lut_xn, lut_yn) is a serial number of an optical compensation block corresponding to the sub-pixel, block_row and block_col are the numbers of row/column directions of the sub-pixels in each optical compensation block, respectively, and n is 1~9.

Then, the optical compensation parameters corresponding to the blocks where the nine sub-pixels are located are read from the optical compensation parameter lookup table b 2DLUT, which are four b1s, two b2s, two b3s and one b4, as shown in FIGS. 9A and 9B.

Finally, the nine b values are weighted and filtered:

$$b = \text{ratio1} * b1 + \text{ratio2} * b1 + \text{ratio3} * b2 + \text{ratio4} * b1 + \text{ratio5} * b1 + \text{ratio6} * b2 + \text{ratio7} * b3 + \text{ratio8} * b3 + \text{ratio9} * b4.$$

Herein, ratio1~ratio9 are the weight coefficients of partition smoothing, ratio1+ratio2+ratio3+ratio4+ratio5+ratio6+ratio7+ratio8+ratio9=1, and b is the final partition smoothing result. An exemplary schematic diagram of weighted filtered optical compensation parameter values is shown in FIG. 9C. When optical compensation is performed using the optical compensation parameters shown in FIG. 9C, the optical compensation effect of the sub-pixels located between two adjacent partitions is more uniform, and the partition traces are effectively reduced.

In the embodiment of the present disclosure, the smoothing processing of the segment parameters of the non-base gray scale segments adjacent to the base gray scale segment and the smoothing processing of the partition optical compensation parameters may be performed in the production process of the display panel or in the playing process of the display panel, and the embodiments of the present disclosure are not limited thereto.

An embodiment of the present disclosure further provides a driving device for a display panel, including a memory and a processor connected to the memory, the memory is configured to store instructions, the processor is configured to perform acts of a method for driving a display panel according to any embodiment of the present disclosure based on the instructions stored in the memory.

Figure 10:
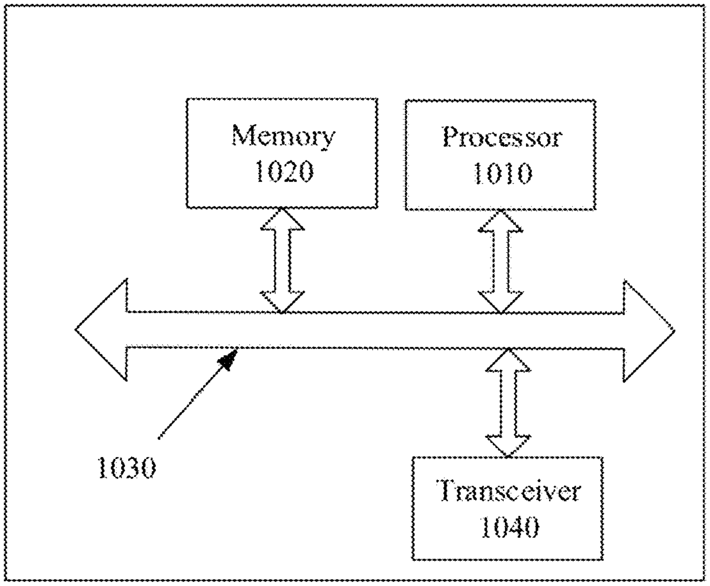
FIG. 10 is a schematic diagram of a structure of a device for driving a display panel according to an exemplary embodiment of the present disclosure.

As shown in FIG. 10, in an embodiment, a driving device for a display panel may include: a processor 1010, a memory 1020, a bus system 1030, and a transceiver 1040. The processor 1010, the memory 1020, and the transceiver 1040 are connected via the bus system 1030, the memory 1020 is configured to store instructions, and the processor 1010 is configured to execute the instructions stored in the memory 1020 to control the transceiver 1040 to transmit and receive signals. Specifically the transceiver 1040 may receive an image to be displayed under the control of the processor 1010, and the processor 1010 inputs a first data voltage group to a first sub-pixel corresponding to a first gray scale segment in the first region; inputs a second data voltage group to a first sub-pixel corresponding to a second gray scale segment in the first region. The first data voltage group includes multiple first data voltages, input gray scales corresponding to the multiple first data voltages are the same, the second data voltage group includes multiple second data voltages, input gray scales corresponding to the multiple second data voltages are the same, and first data voltage standard deviation of the first data voltage group is larger than the second data voltage standard deviation of the second data voltage group.

It should be understood that the processor 1010 may be a Central Processing Unit (CPU), or the processor 1010 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor, or the processor may be any conventional processor, etc.

The memory 1020 may include a read only memory and a random access memory, and provides instructions and data to the processor 1010. A portion of the memory 1020 may also include a non-volatile random access memory. For example, the memory 1020 may also store information of a device type.

The bus system 1030 may include a power bus, a control bus, a status signal bus, or the like in addition to a data bus. However, for clarity of illustration, various buses are denoted as the bus system 1030 in FIG. 10.

In an implementation process, the processing performed by the processing device may be completed by an integrated logic circuit of hardware in the processor 1010 or instructions in the form of software. That is, the acts of the method in the embodiments of the present disclosure may be embodied to be executed and completed by a hardware processor, or executed and completed by a combination of hardware in the processor and a software module. The software modules may be located in a storage medium, such as a random access memory, a flash memory, a read-only memory, a programmable read-only memory, an electrically erasable programmable memory, or register. The storage medium is located in the memory 1020, and the processor 1010 reads the information in the memory 1020 to complete the acts of the method described above in conjunction with its hardware. In order to avoid repetition, detailed description is not provided herein.

An embodiment of the present disclosure further provides a display panel including a driving device for the display panel as described in any embodiment of the present disclosure.

An embodiment of the present disclosure further provides a computer-readable storage medium having stored thereon a computer program. When the program is executed by a processor, the method for driving a display panel according to any embodiment of the present disclosure is implemented. The method for driving the display panel by executing an executable instruction is basically the same as the method for driving the display panel provided in the above embodiments of the present disclosure, and will not be described in detail here.

In some possible implementations, various aspects of the method for driving the display panel provided in the present application may also be implemented in a form of a program product, which includes a program code. When the program product is run on a computer device, the program code is used for enabling the computer device to execute acts in the method for driving the display panel according to various exemplary implementations of the present application described above in this specification, for example, the computer device may execute the method for driving the display panel described in the embodiments of the present application.

For the program product, any combination of one or more readable media may be adopted. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of the readable storage medium include electrical connections with one or more wires, portable computer disks, hard disks, random access memories (RAMs), read-only memories (ROMs), erasable programmable read-only memories (EPROMs or flash memories), optical fibers, portable compact disk read-only memories (CD-ROMs), optical storage devices, magnetic storage devices, or any suitable combination of the above.

It may be understood by those of ordinary skills in the art that all or some acts in a method and function modules/units in a system and a device disclosed above may be implemented as software, firmware, hardware, or an appropriate combination thereof. In a hardware implementation, division of the function modules/units mentioned in the above description is not always division corresponding to physical components. For example, a physical component may have multiple functions, or several physical components may cooperate to execute a function or an act. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. Furthermore, it is well known to those of ordinary skills in the art that the communication medium typically contains computer readable instructions, a data structure, a program module, or other data in a modulated data signal such as a carrier or another transmission mechanism, or the like, and may include any information delivery medium.

Although the implementations disclosed in the present disclosure are described as above, the described contents are only implementations which are used for facilitating the understanding of the present disclosure, and are not intended to limit the present invention. Any skilled person in the art to which the present disclosure pertains may make any modifications and variations in forms and details of implementation without departing from the spirit and scope of the present disclosure. However, the patent protection scope of the present invention should be subject to the scope defined by the appended claims.

The invention claimed is:

1. A method for driving a display panel, wherein the display panel comprises a first region comprising a first sub-pixel displaying a first color, the first color comprises a first gray scale segment and a second gray scale segment, and the method for driving the display panel comprises:

inputting a first data voltage group to a first sub-pixel corresponding to the first gray scale segment in the first region;

inputting a second data voltage group to a first sub-pixel corresponding to the second gray scale segment in the first region;

the first data voltage group comprises a plurality of first data voltages, input gray scales corresponding to the plurality of first data voltages are the same, the second data voltage group comprises a plurality of second data voltages, input gray scales corresponding to the plurality of second data voltages are the same, and a first data voltage standard deviation of the first data voltage group is larger than a second data voltage standard deviation of the second data voltage group.

2. The method according to claim 1, wherein inputting the first data voltage group to the first sub-pixel corresponding to the first gray scale segment in the first region comprises:

determining an optical compensation parameter corresponding to each first sub-pixel corresponding to the first gray scale segment in the first region;

obtaining a gray scale value after optical compensation of the each first sub-pixel corresponding to the first gray scale segment in the first region according to an input gray scale and the optical compensation parameter of the each first sub-pixel corresponding to the first gray scale segment in the first region;

determining and inputting a first data voltage of the each first sub-pixel corresponding to the first gray scale segment in the first region according to the gray scale value after optical compensation of the each first sub-pixel corresponding to the first gray scale segment in the first region.

3. The method according to claim 2, wherein obtaining the gray scale value after optical compensation of the each first sub-pixel corresponding to the first gray scale segment in the first region according to the input gray scale and optical compensation parameter of the each first sub-pixel corresponding to the first gray scale segment in the first region, comprises:

acquiring a full-screen adjustment value a;

for each first sub-pixel corresponding to the first gray scale segment in the first region, performing the following operations:

calculating an intermediate gray scale temp_gray: temp_gray=a*gray+b according to the full-screen adjustment value a, the input gray scale gray and the optical compensation parameter b corresponding to the first sub-pixel corresponding to the first gray scale segment in the first region;

obtaining the gray scale value after optical compensation demura_gray: demura_gray=min (max (temp_gray, min_gray), max_gray) according to the intermediate gray scale temp_gray and a preset minimum gray scale min_gray and a preset maximum gray scale max_gray.

4. The method according to claim 1, wherein inputting the second data voltage group to the first sub-pixel corresponding to the second gray scale segment in the first region comprises:

determining a segment parameter and an optical compensation parameter which correspond to each first sub-pixel corresponding to the second gray scale segment in the first region;

obtaining a gray scale value after optical compensation of the each first sub-pixel corresponding to the second gray scale segment in the first region according to the input gray scale, segment parameter and optical compensation parameter of the each first sub-pixel corresponding to the second gray scale segment in the first region; and determining and inputting a second data voltage of each first sub-pixel corresponding to the second gray scale segment in the first region according to the gray scale value after optical compensation of the each first sub-pixel corresponding to the second gray scale segment in the first region.

5. The method according to claim 4, wherein the segment parameter comprises a first segment parameter aa, a second segment parameter bb, and a third segment parameter brisebit, obtaining the gray scale value after optical compensation of the each first sub-pixel corresponding to the second gray scale segment in the first region according to the input gray scale, segment parameter and optical compensation parameter of the each first sub-pixel corresponding to the second gray scale segment in the first region comprises:

acquiring a full-screen adjustment value a;

for each first sub-pixel corresponding to the second gray scale segment in the first region, performing the following operations:

adjusting the optical compensation parameter by using the segment parameter corresponding to each first sub-pixel according to the following formula:

pro_b=aa*b*(2 ^brisebit)+bb, wherein b is the optical compensation parameter, and pro_b is the adjusted optical compensation parameter of each sub-pixel;

calculating an intermediate gray scale temp_gray: temp_gray=a*gray+pro_b according to the full-screen adjustment value a, the input gray scale gray and the adjusted optical compensation parameter pro_b of the each sub-pixel;

obtaining the gray scale value after optical compensation demura_gray: demura_gray=min (max (temp_gray, min_gray), max_gray) according to the intermediate gray scale temp_gray and a preset minimum gray scale min_gray and a preset maximum gray scale max_gray.

6. The method according to claim 1, wherein inputting the second data voltage group to the first sub-pixel corresponding to the second gray scale segment in the first region comprises:

acquiring a full-screen adjustment value a;

for each first sub-pixel corresponding to the second gray scale segment in the first region, performing the following operations:

calculating an intermediate gray scale temp_gray temp_gray=a*gray according to the full-screen adjustment value a and an input gray scale gray;

obtaining a gray scale value after optical compensation demura_gray: demura_gray=min (max (temp_gray, min_gray), max_gray) according to the intermediate gray scale temp_gray and a preset minimum gray scale min_gray and a preset maximum gray scale max_gray;

determining and inputting a second data voltage of the each first sub-pixel corresponding to the second gray scale segment in the first region according to the gray scale value after optical compensation of the each first sub-pixel corresponding to the second gray scale segment in the first region.

7. The method according to claim 1, wherein inputting the first data voltage group to the first sub-pixel corresponding to the first gray scale segment in the first region comprises:

determining an optical compensation parameter and a partition adjustment value corresponding to each first sub-pixel corresponding to the first gray scale segment in the first region;

obtaining a gray scale value after optical compensation of the each first sub-pixel corresponding to the first gray scale segment in the first region according to the input gray scale, optical compensation parameter and partition adjustment value of the each first sub-pixel corresponding to the first gray scale segment in the first region; and determining and inputting the first data voltage of the each first sub-pixel corresponding to the first gray scale segment in the first region according to the gray scale value after optical compensation of the each first sub-pixel corresponding to the first gray scale segment in the first region.

8. The method according to claim 1, wherein the first color further comprises a third gray scale segment between the first gray scale segment and the second gray scale segment, the method for driving the display panel further comprises:

inputting a third data voltage group to a first sub-pixel corresponding to the third gray scale segment in the first region;

wherein the third data voltage group comprises a plurality of third data voltages, input gray scales corresponding to the plurality of third data voltages are the same, and a third data voltage standard deviation of the third data voltage group is larger than the second data voltage standard deviation of the second data voltage group and smaller than the first data voltage standard deviation of the first data voltage group.

9. The method according to claim 1, wherein inputting the third data voltage group to the first sub-pixel corresponding to the third gray scale segment in the first region comprises:

determining a segment parameter and an optical compensation parameter corresponding to each first sub-pixel corresponding to a third gray scale segment in the first region;

obtaining a gray scale value after optical compensation of the each first sub-pixel corresponding to the third gray scale segment in the first region according to the input gray scale, segment parameter and optical compensation parameter of the each first sub-pixel corresponding to the third gray scale segment in the first region; and determining and inputting a third data voltage of each first sub-pixel corresponding to the third gray scale segment in the first region according to the gray scale value after optical compensation of the each first sub-pixel corresponding to the third gray scale segment in the first region.

10. The method according to claim 9, wherein the segment parameter comprises a first segment parameter aa, a second segment parameter bb, and a third segment parameter brisebit, and determining the segment parameter corresponding to the each first sub-pixel corresponding to the third gray scale segment in the first region comprises:

acquiring a first segment parameter $aa_{base}$, a second segment parameter $bb_{base}$, and a third segment parameter $brisebit_{base}$ that correspond to the first gray scale segment, wherein, $aa_{base}=1$, $bb_{base}=0$, $brisebit_{base}=0$;

acquiring a first segment parameter $aa_{nonbase1}$, a second segment parameter $bb_{nonbase1}$, and a third segment parameter $brisebit_{nonbase1}$ that correspond to the third gray scale segment;

calculating a first segment parameter $aa_{nonbase1\_final}$, a second segment parameter $bb_{nonbase1\_final}$, and a third segment parameter $brisebit_{nonbase1\_final}$ after weighted average is performed on the third gray scale segment according to the following formulas, as final segment parameters of the third gray scale segment:

$$aa_{nonbase1\_final} = p1 * aa_{base} + q1 * aa_{nonbase1};$$

$$bb_{nonbase1\_final} = p1 * bb_{base} + q1 * bb_{nonbase1};$$

$$brisebit_{nonbase1\_final} = p1 * brisebit_{base} + q1 * brisebit_{nonbase1};$$

wherein p1 is a first weight coefficient, q1 is a second weight coefficient, and p1+p2=1.

11. The method according to claim 1, wherein the display panel further comprises a second region comprising a first sub-pixel displaying the first color, the method for driving the display panel further comprises:

inputting a fourth data voltage group to a first sub-pixel corresponding to the first gray scale segment in the second region, and inputting a fifth data voltage group to a first sub-pixel corresponding to the second gray scale segment in the second region;

the fourth data voltage group comprises a plurality of fourth data voltages, input gray scales corresponding to the plurality of fourth data voltages are the same, the fifth data voltage group comprises a plurality of fifth data voltages, input gray scales corresponding to the plurality of fifth data voltages are the same, a fourth data voltage standard deviation of the fourth data voltage group is smaller than the first data voltage standard deviation, and a fifth data voltage standard deviation of the fifth data voltage group is smaller than the first data voltage standard deviation.

12. The method according to claim 11, wherein the first region is a human eye gaze region, and the second region is a non-human eye gaze region; or the fourth data voltage standard deviation of the fourth data voltage group is equal to 0, and the fifth data voltage standard deviation of the fifth data voltage group is equal to 0.

13. The method according to claim 11, wherein inputting the fourth data voltage group to the first sub-pixel corresponding to the first gray scale segment in the second region, and inputting the fifth data voltage group to the first sub-pixel corresponding to the first gray scale segment in the second region comprises:

determining and inputting a fourth data voltage of the first sub-pixel corresponding to the first gray scale segment in each of the second regions according to the input gray scale value of the first sub-pixel corresponding to the first gray scale segment in each of the second region;

determining and inputting a fifth data voltage of the first sub-pixel corresponding to the second gray scale segment in each of the second regions according to the input gray scale value of the first sub-pixel corresponding to the second gray scale segment in each of the second region.

14. The method according to claim 1, wherein the first region further comprises a second sub-pixel displaying a second color, the method for driving the display panel further comprises:

inputting a sixth data voltage group to a second sub-pixel corresponding to the first gray scale segment in the first region;

the sixth data voltage group comprises a plurality of sixth data voltages, input gray scales corresponding to the plurality of sixth data voltages are the same, and a sixth data voltage standard deviation of the sixth data voltage group is smaller than the first data voltage standard deviation of the first data voltage group.

15. The method according to claim 14, wherein inputting the sixth data voltage group to the second sub-pixel corresponding to the first gray scale segment in the first region comprises:

determining and inputting a sixth data voltage of each second sub-pixel corresponding to the first gray scale segment in the first region according to the input gray scale value of the each second sub-pixel corresponding to the first gray scale segment in the first region; or inputting the sixth data voltage group to the second sub-pixel corresponding to the first gray scale segment in the first region comprises:

acquiring a full-screen adjustment value a;

for each second sub-pixel corresponding to the first gray scale segment in the first region, performing the following operations:

calculating an intermediate gray scale temp_gray temp_gray=a*gray according to the full-screen adjustment value a and an input gray scale gray;

obtaining a gray scale value after optical compensation demura_gray: demura_gray=min (max (temp_gray, min_gray), max_gray) according to the intermediate gray scale temp_gray and a preset minimum gray scale min_gray and a preset maximum gray scale max_gray; and determining and inputting a sixth data voltage of each second sub-pixel corresponding to the first gray scale segment in the first region according to the gray scale value after optical compensation of the each second sub-pixel corresponding to the first gray scale segment in the first region.

16. The method according to claim 14, wherein a sixth data voltage standard deviation of the sixth data voltage group is equal to 0.

17. The method according to claim 1, wherein the first region further comprises a first optical compensation block and a second optical compensation block; the method for driving the display panel further comprises:

inputting a seventh data voltage group to a first sub-pixel corresponding to the first gray scale segment in the first optical compensation block;

inputting an eighth data voltage group to a first sub-pixel corresponding to the first gray scale segment in the second optical compensation block;

wherein, the seventh data voltage group comprises a plurality of seventh data voltages, the eighth data voltage group comprises a plurality of eighth data voltages, input gray scales corresponding to the plurality of seventh data voltages and the plurality of eighth data voltages are the same, and a seventh data voltage corresponding to a sub-pixel located in a central region of the first optical compensation block is larger than a seventh data voltage corresponding to a sub-pixel adjacent to the second optical compensation block in the first optical compensation block; an eighth data voltage corresponding to a sub-pixel located in a central region of the second optical compensation block is smaller than an eighth data voltage corresponding to a sub-pixel adjacent to the first optical compensation block in the second optical compensation block.

18. The method according to claim 17, wherein inputting the seventh data voltage group to the first sub-pixel corresponding to the first gray scale segment in the first optical compensation block and inputting the eighth data voltage group to the first sub-pixel corresponding to the first gray scale segment in the second optical compensation block comprises:

acquiring a segment parameter corresponding to the first gray scale segment;

acquiring an optical compensation parameter, corresponding to each first sub-pixel in the first optical compensation block and the second optical compensation block, and optical compensation parameters corresponding to a first sub-pixel in a m1*n1 region around each first sub-pixel, wherein m1 and n1 are odd numbers greater than 1;

performing weighting filtering on the optical compensation parameter corresponding to each first sub-pixel in the first optical compensation block and the second optical compensation block according to the optical compensation parameters corresponding to the first sub-pixels in the m1*n1 region around each first sub-pixel, and obtain a final optical compensation parameter of each first sub-pixel; and obtaining and inputting a seventh data voltage or an eighth data voltage corresponding to each of the first sub-pixels according to the segment parameter corresponding to the first gray scale segment, the final optical compensation parameter of each of the first sub-pixels and an input gray scale value.

19. A device for driving a display panel, comprising a memory and a processor coupled to the memory for storing instructions, wherein the processor is configured to perform the acts of the method for driving the display panel according to claim 1 based on the instructions stored in the memory.

20. A display panel, comprising the device for driving the display panel according to claim 19.

* * * * *